(12) United States Patent
Okumura

(10) Patent No.: US 7,020,209 B1
(45) Date of Patent: Mar. 28, 2006

(54) DATA TRANSMISSION METHOD, DATA TRANSMISSION SYSTEM, TRANSMITTER AND RECEIVER

(75) Inventor: Yukihiko Okumura, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 1011 days.

(21) Appl. No.: 09/763,375

(22) PCT Filed: Jun. 5, 2000

(86) PCT No.: PCT/JP00/03650

§ 371 (c)(1),
(2), (4) Date: Feb. 21, 2001

(87) PCT Pub. No.: WO00/79720

PCT Pub. Date: Dec. 28, 2000

(30) Foreign Application Priority Data

Jun. 21, 1999 (JP) ................................. 11-174760

(51) Int. Cl.
*H04B 14/04* (2006.01)

(52) U.S. Cl. ...................... 375/253; 375/341; 714/752; 714/756; 714/758; 714/786; 714/794

(58) Field of Classification Search ................ 375/253, 375/259, 262, 295–352; 714/746–824
See application file for complete search history.

(56) References Cited

U.S. PATENT DOCUMENTS

| 5,896,374 A | 4/1999 | Okumura et al. | 370/311 |
| 5,978,414 A | 11/1999 | Nara | |
| 6,108,384 A * | 8/2000 | Okumura et al. | 375/262 |
| 6,272,187 B1 * | 8/2001 | Rick | 375/341 |

FOREIGN PATENT DOCUMENTS

| EP | 0 758 168 A1 | 2/1997 |
| EP | 0 866 589 A1 | 9/1998 |
| JP | 02-211722 | 8/1990 |
| JP | WO96/26582 | 8/1996 |
| JP | 9-501548 | 2/1997 |

(Continued)

OTHER PUBLICATIONS

Okumura et al., "Blind Variable Rate Detection Using Viterbi Decoding Path-metric in Coherent DS-CDMA", Technical Research Report of the Institute of Electronics, Information and Communication Engineers, RCS 96-101, Nov. 14, 1996, pp. 17-23.

(Continued)

*Primary Examiner*—Stephen Chin
*Assistant Examiner*—Curtis Odom
(74) *Attorney, Agent, or Firm*—Workman Nydegger

(57) ABSTRACT

A data transmission method etc. are provided. At the transmitting side, an error-detecting code of the transmitted data is calculated, frame by frame, the error-detecting code is arranged after the corresponding transmitted data, and frame data is generated in such a way that bit arrangements of the transmitted data and of the error-detecting code are set in a reverse order to each other. At the receiving side, the transmitted data and the error-detecting code are assumed by assuming a final bit position of the frame data, frame by frame, for the received frame data and the error-detecting code of the assumed transmitted data is calculated. A position such where the assumed error-detecting code agrees with an error-detecting code calculated on the basis of the assumed transmitted data is determined to be the final bit position of the frame data.

41 Claims, 19 Drawing Sheets

TRANSMITTER CONFIGURATION

FOREIGN PATENT DOCUMENTS

| | | |
|---|---|---|
| JP | 9-503359 | 3/1997 |
| JP | WO97/50219 | 12/1997 |
| JP | 10093530 A | 4/1998 |
| JP | 11163962 A | 6/1999 |
| WO | WO 95/01032 | 1/1995 |
| WO | WO 95/08888 | 3/1995 |

OTHER PUBLICATIONS

Okumura et al., "Variable Rate Data Transmissions on Single Code-Channel in DS-CDMA", Technical Research Report of the Institute of Electronics, Information and Communication Engineers, EMCJ95-106, RCS 95-166, MW95 183, Feb. 27, 1996, pp. 55-60.

"CRC position", TSGRI (99) 689, TSG-RAN Working Group 1 meeting#5, Cheju, Korea, Jun. 1-4, 1999.

Ad hoc #4 chair, "Second ad hoc #4 meeting report", TSGR1 #5 (99) 723, TSG-RAN Working Group 1 meeting #5, Cheju, South Korea, Jun. 1-4, 1999.

"CR for parity bit attachment to 0 bit transport block", TSGR1 #9(99)L34, TSG-RAN Working Group 1 meeting #9, Dresden, Germany, Nov. 30-Dec. 3, 1999.

"A scheme to measure quality for outer loop TPC during DPDCH OFF", TSGR1 #9(99)j78, TSG-RAN Working Group 1 meeting #9, Dresden, Germany, Nov. 30-Dec. 3, 1999.

* cited by examiner

○ TRANSMISSION BIT ORDER (D0 TO D9 SHOW TRANSMITTED DATA, C4 TO C0 SHOW CRC BITS)

CONVENTIONAL POSTPOSITION : D9,D8,D7,D6,D5,D4,D3,D2,D1,D0,C4,C3,C2,C1,C0

PREPOSITION : C4,C3,C2,C1,C0,D9,D8,D7,D6,D5,D4,D3,D2,D1,D0

FIG.1A

○ RECEIVED DATA BIT AND RECEIVED CRC BIT
(WHEN DETECTING A POSITION WHERE THE NUMBER OF BITS IS SMALLER BY ONE FROM THE CORRECT RATE POSITION)

CONVENTIONAL POSTPOSITION: DATA = D9,D8,D7,D6,D5,D4,D3,D2,D1　CRC=D0,C4,C3,C2,C1

PREPOSITION: DATA = D9,D8,D7,D6,D5,D4,D3,D2,D1　CRC=C4,C3,C2,C1,C0

FIG.1B

○TRANSMISSION BIT ORDER (D0 TO D9 SHOW TRANSMITTED DATA, C4 TO C0 SHOW CRC BITS)

CONVENTIONAL POSTPOSITION: D9,D8,D7,D6,D5,D4,D3,D2,D1,D0,C4,C3,C2,C1,C0

NEW POSTPOSITION: D9,D8,D7,D6,D5,D4,D3,D2,D1,D0,C0,C1,C2,C3,C4

FIG.2A

○RECEIVED DATA BIT AND RECEIVED CRC BIT
  (WHEN DETECTING A POSITION WHERE THE NUMBER OF BITS IS
   SMALLER BY ONE FROM THE CORRECT RATE POSITION)

CONVENTIONAL POSTPOSITION: DATA =D9,D8,D7,D6,D5,D4,D3,D2,D1  CRC=D0,C4,C3,C2,C1

NEW POSTPOSITION: DATA =D9,D8,D7,D6,D5,D4,D3,D2,D1  CRC=D0,C0,C1,C2,C3

FIG.2B

RECEIVER CONFIGURATION

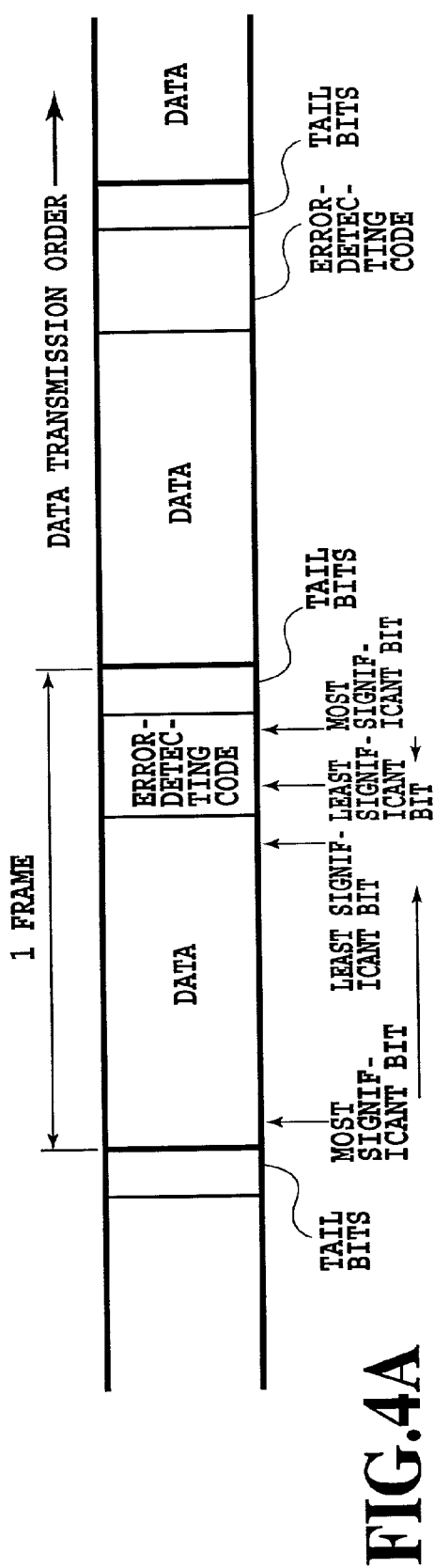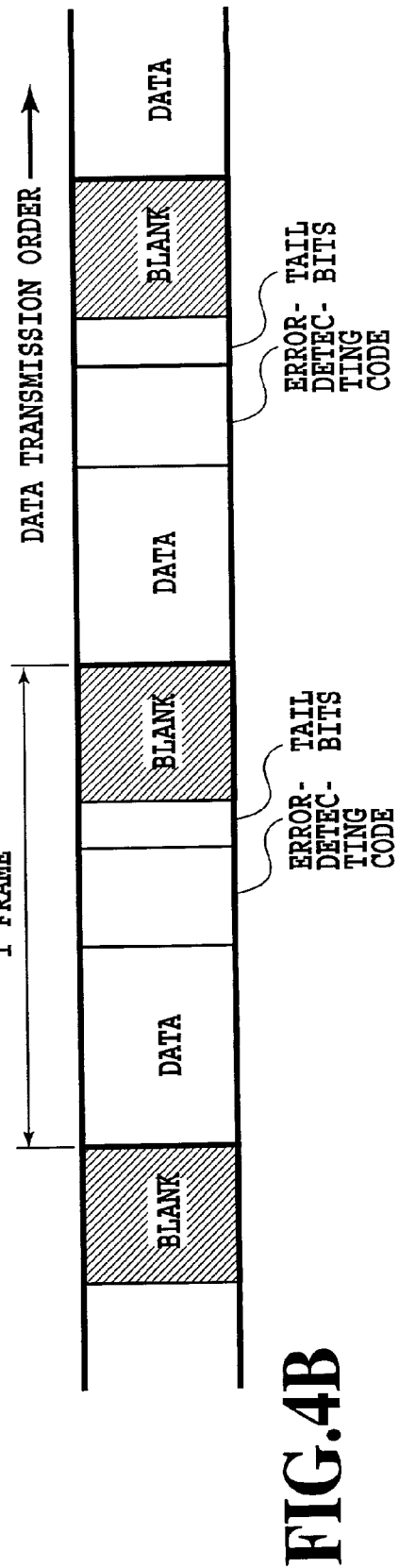
FIG.4A
FIG.4B

TRANSMITTER CONFIGURATION

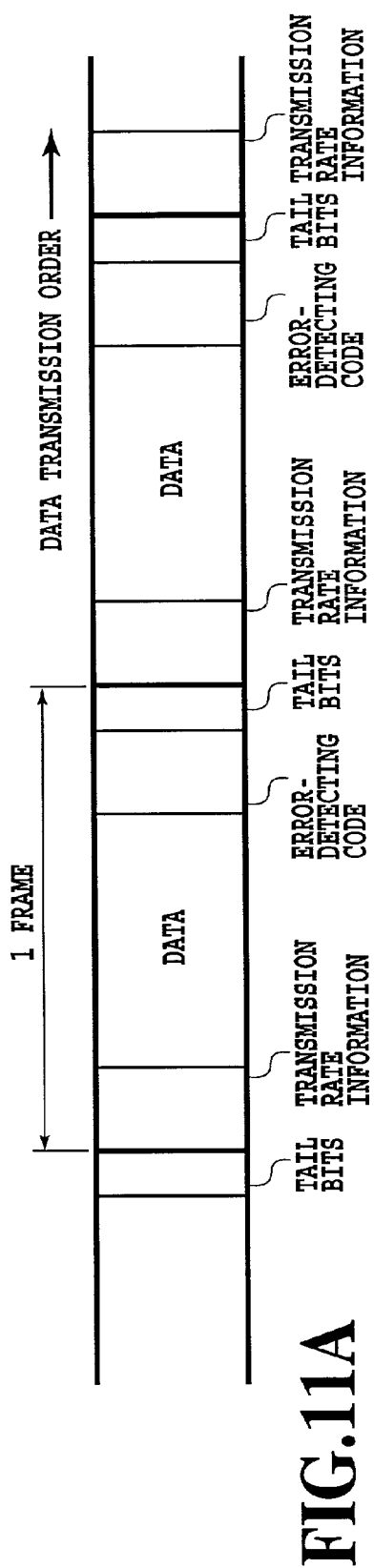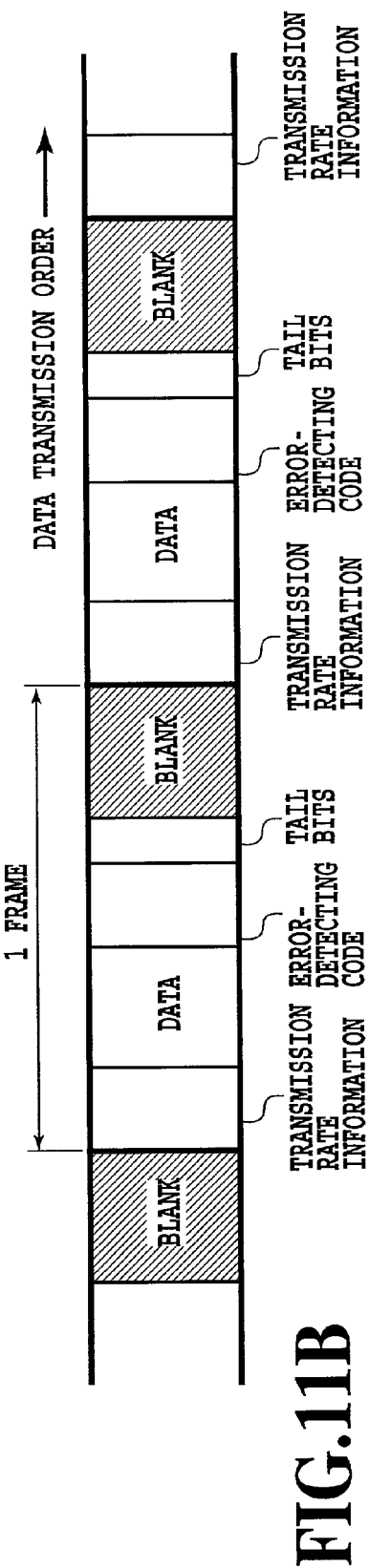
FIG.11A
FIG.11B

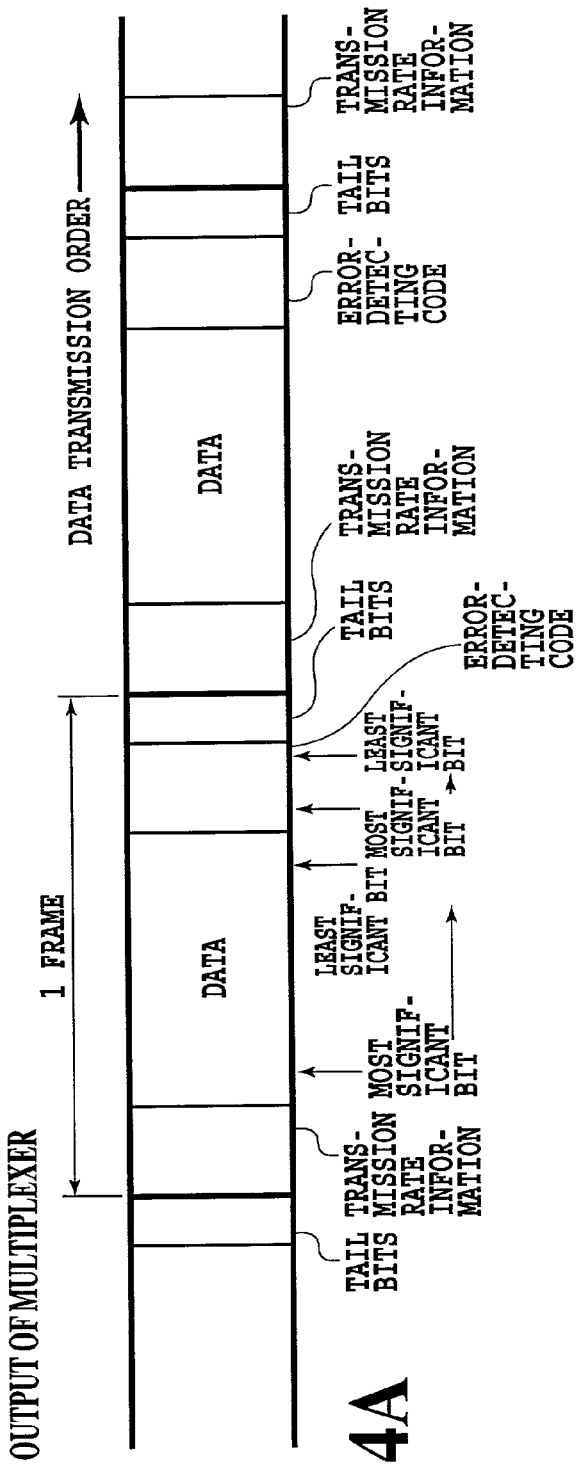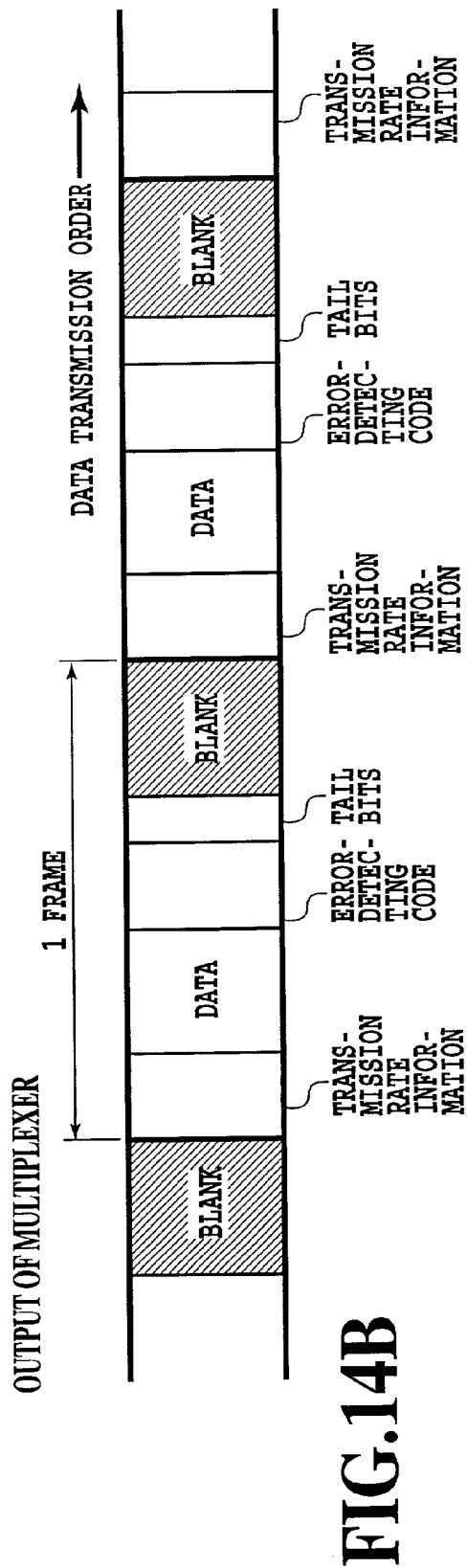

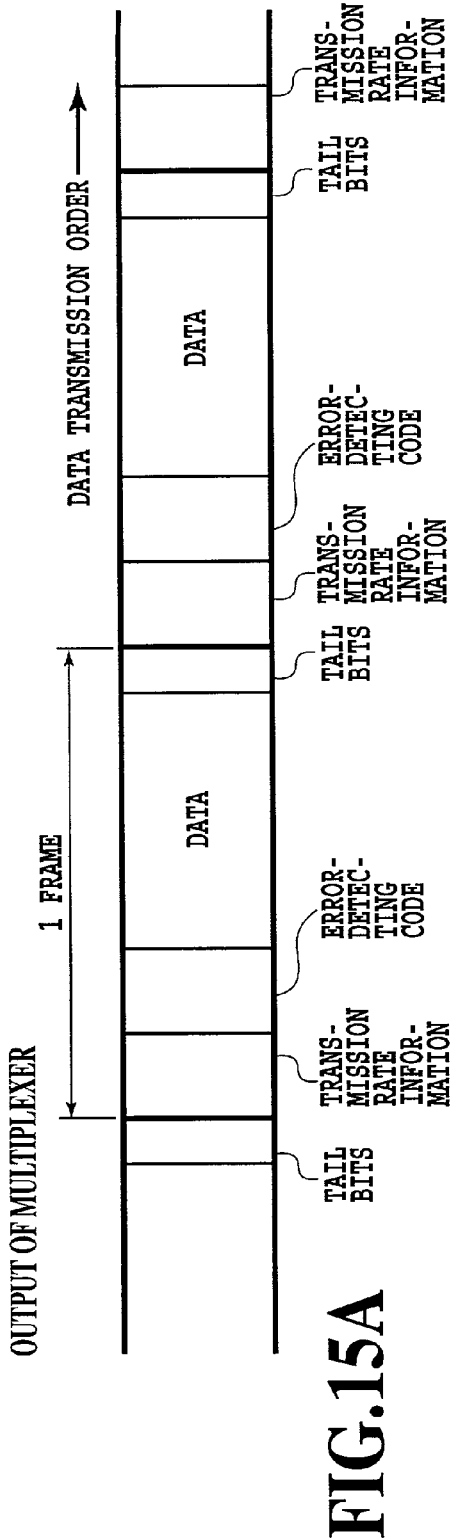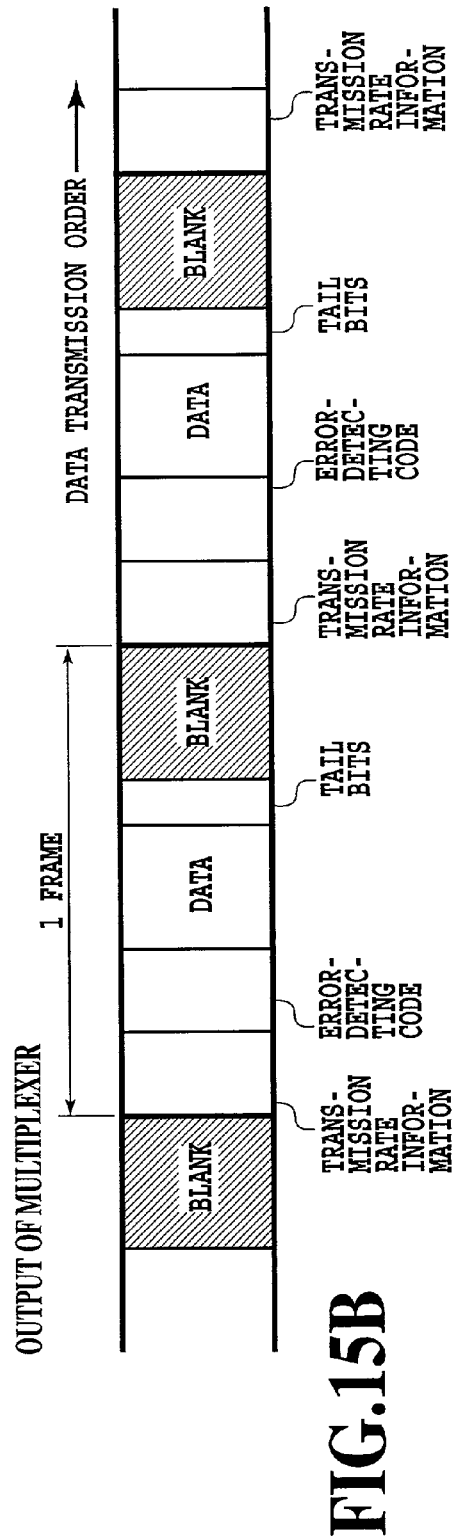

DATA TRANSMISSION METHOD, DATA TRANSMISSION SYSTEM, TRANSMITTER AND RECEIVER

TECHNICAL FIELD

The present invention relates to a data transmission method, a data transmission system, a transmitter and a receiver where variable length transmitted data is put into each frame of a fixed time length and transmitted. In the variable rate data transmission in digital data transmission equipment, the present invention solves a problem that the conventional technology possesses on the basis of error detecting technology and error correcting technology by means of contrivances in a method of transmitting error-detecting code parity bits and in a method of determining the rate on the basis of error-correcting decoding likelihood information, improves performance of detecting the rate, and implements high-quality variable rate data transmission.

BACKGROUND ART

In the data transmission method where information of voice signals and the like is converted into digital data and transmitted, an amount of information to be transmitted is not always constant in terms of time, but generally may change from time to time.

Accordingly, if the transmission data is divided into frame units each having a fixed time length and each frame consisting of variable number of bits is transmitted frame by frame to achieve the data transmission, a transmission rate can be varied temporally and necessary information can be transmitted efficiently in each frame period. At this time, a transmitter need not conduct useless transmission and hence the power consumption of the apparatus can be suppressed to low.

To conduct data transmission with varying transmission rate, normally it is necessary for the receiving side to get information indicating how fast the transmission rate of each frame is by means of some kind or another. For this purpose, conventionally there have been two methods: one is a method whereby the rate information is transmitted directly as part of frame data and the receiving side determines the rate on the basis of this information; and the other is a method where no rate information is sent, but the receiving side judges the rate with an error-detecting code that is added to the transmitted data to indicate transmission quality (for example, CRC: Cyclic Redundancy Check code), called a blind rate detection method (for example, refer to International Publication No. WO96/26582 applied by the present applicant).

On the other hand, in communication environments where transmission errors occur frequently such as data transmission via a radio transmission path, it is commonly in practice to improve transmission quality by conducting error correction of the transmitted data (FEC: Forward Error Correction). For error-correcting codes and error-correcting decoding, for example, a convolutional code and maximum likelihood decoding methods such as Viterbi decoding are used.

In addition, in the method where the receiving side determines the rate by using the error-detecting code that is added to the transmitted data to indicate the transmission quality without sending any rate information, a decision error rate in determining the rate depends on a word length of the error-detecting code and doesn't decrease below a certain rate-decision error rate (namely, a probability of determining that no transmission error exists for an erroneous rate) even if the transmission error goes down.

On the other hand, in the case where the rate information is sent from the transmitting side to the receiving side, if an error occurs during transmission, an effective data length in the received frame cannot be judged and it becomes difficult for the receiving side to reproduce the transmitted data correctly even if no error occurs in the data part.

Therefore, conventionally there has been devised a method whereby the rate-decision error rate was improved through the use of the likelihood information at the time of the maximum likelihood decoding and the transmission rate is allowed to vary, frame by frame, more securely during the transmission (for example, refer to International Publication No. WO97/50219 applied by the present applicant).

In the above-mentioned WO96/26582 and WO97/50219, described is a method where, in order to improve the rate detection performance at the receiving side (that is, to reduce the probability of detecting the rate mistakenly), CRC bits that have been conventionally added to the end of the transmitted data (in this case the position of the CRC bits in the frame depends on the bit length of the transmitted data) are arranged at a fixed position in the frame (for example, at the first position of the frame) and transmitted.

FIGS. 1A and 1B are diagrams showing an example of transmission bit arrangement of the conventional scheme.

In the conventional method where the CRC bits are arranged after transmitted data bits ("conventional postposition"), for example, when a position one bit ahead from the correct rate position is detected, since the codewords at the receiving side goes successively as D1 to D0 and C4 to C1, even if no transmission bit error occurs, the decision result by CRC shows OK (namely, erroneous detection) with a probability of 50 percent. Similarly to this, when a position two bits and three bits ahead from the correct rate position is detected, the decision result by CRC indicates OK erroneously with a probability of 25 percent and 12.5 percent, respectively.

To solve such a problem that the probability of detecting the rate mistakenly becomes larger as the assumed position approaches the correct rate position, there was devised a method where the CRC bits are arranged at the first position of the frame in the above-mentioned WO96/26582 and WO97/50219. In this method, as shown in FIG. 1B ("preposition" case), since a codeword arrangement at the receiving side is discontinuous as D1, C4 to C1, the above-mentioned problem does not occur and a low probability of detecting the rate mistakenly that is determined by the word length of the CRC code can be obtained constantly, from a detection position adjacent to the correct position to a detection position remote therefrom.

However, in order that the transmitting side arranges the CRC bits always at the first position of the frame, that is, ahead of the transmitted data and transmits, it is essential to store temporarily the whole bits of the transmitted data in memory until calculation of the error-detecting code for the transmitted data is completed. Such buffer memory becomes large in size in proportion to the number of the transmitted data bits of one frame, and when a huge amount of the transmitted data is sent, hardware scale of the memory presents a problem.

On the other hand, in the variable rate data transmission that is assumed in WO96/26582 and WO97/50219, the number of the transmitted data bits in the frame is always a finite value and the case where the number of bits is zero was not described. In actual data transmission, there are cases where the number of the transmitted data bits to be sent becomes zero, for example, as a silent interval in the case of transmission of voice information (namely, an interval when a sender does not talk). It is necessary for the receiving side to perform the rate detection properly including such cases (namely, cases where apparent transmission rate=0) (this is because there may be a case where, at the receiving side, a decoder of voice codec (CODEC) recognizes that an interval is a silent interval and conducts processing different from that of a non-silent interval, such as generating background noise). A parity bit or parity bits of the conventional error-detecting code (or CRC) is the one that is calculated for a transmitted data sequence of a finite size and transmitted together with the data, and in such cases as mentioned above where the number of the transmitted data bits becomes zero, commonly the error-detecting code is not added. This means that the rate detection method on the basis of the error-detecting code as described in WO96/26582 and WO97/50219 cannot be applied as it is.

Further, in the WO97/50219 described is that by using the likelihood obtained at the time of conducting the error-correcting decoding (or Viterbi decoding) as rate detection information, a lower probability of detecting the rate mistakenly can be achieved and the rate detection performance can be improved. In the rate detection according to the above-mentioned method, WO97/50219 specifies that the likelihood obtained at each of the assumed final bit positions is compared with a previously-specified value Δ (decision of a threshold) (refer to FIG. 6 in WO97/50219), and in this occasion it is assumed that one kind of Δ value is used in common regardless of the assumed final bit position. However, when this technology is applied in actual radio communication environments, a proper value of Δ for obtaining desired detection performance may differ for each final bit position (i.e. different number of the transmitted data bits in the frame) depending on a distribution tendency of bit transmission errors in the transmission path. For this case, if a single value of Δ is used in common, the rate detection performance varies according to the final bit position; therefore there arises a problem in that average quality of the variable rate data transmission including the rate detection performance changes when a distribution of occurrence probability for transmission rates (final bit positions) varies.

DISCLOSURE OF THE INVENTION

Accordingly, an object of the present invention is, in the variable rate data transmission, to decrease the probability of detecting the rate mistakenly at the receiving side and to eliminate the need for providing buffer for temporarily storing the transmitted data at the transmitting side.

Furthermore, another object of the present invention is, in a broad area of communication environments and variable rate conditions, to make it possible to implement a high-efficiency and high-quality variable rate data transmission.

To solve the above-mentioned first problem, in the present invention, the error-detecting code (for example, the CRC bits) is arranged after the transmitted data, bit arrangements of the transmitted data and of the error-detecting code are set in a reverse order to each other, and the data and code are transmitted.

FIGS. 2A and 2B are diagrams showing examples of the transmission bit arrangements of the conventional scheme and of the scheme according to the present invention. As can be understood from the figures, according to the arrangement of the present invention ("new postposition"), since the codeword arrangement at the receiving side is discontinuous as D1, D0, C0, there does not occur a problem in that the probability of detecting the rate mistakenly increases as the detection position approaches the correct rate position and a low probability of detecting the rate mistakenly that is determined by the word length of the CRC code can be obtained constantly, from a detection position adjacent to the correct position to a detection position remote therefrom.

Moreover, since the bit arrangement according to the present invention is such that CRC is arranged after the transmitted data, it is not necessary to provide the buffer for temporarily storing the transmitted data while maintaining the rate detection performance high as mentioned above and hardware can be implemented with a small circuit scale.

Furthermore, to solve the above-mentioned second problem, in the present invention, even for the frame whose number of data bits to be transmitted is zero, bits equivalent to the parity bits of the error-detecting code (which has a previously-specified bit pattern) is transmitted (because of absence of data, only this parity-bit equivalent bits are error-correcting coded and transmitted); the receiving side conducts the rate detection including the final bit position when the number of data bits is zero—regarding the error detection of this case, the calculation of the error-detecting code (re-coding) for the received data is unnecessary and all that is needed is only to compare the received parity-bit equivalent bits with the previously-specified bit pattern. The length of the above-mentioned bit pattern may be the same as that of the parity bits of the error-detecting code (or CRC) that is given when the number of other data bits is not zero to use the circuit in common. However, these lengths may be different according to need. For the above-mentioned bit pattern, it is necessary to specify previously at least one kind of a pattern, but it may be possible that a plurality of patterns are specified and one of these is used in combination with other purpose (each of various control information is transmitted being mapped with each bit pattern).

Furthermore, to solve the above-mentioned third problem, the present invention makes it possible to conduct the decision-making by setting different values of a set threshold Δ used for threshold decision (Δ1, Δ2, . . . ΔL, . . . , ΔN) which are corresponding to respective final bit positions (respective transmission rate), other than a single set threshold. Here, a value of each ΔL may be altered so as to be always an optimal value in accordance with the change of the communication environment. Furthermore, the same value may be used for a part repeatedly if necessary.

In order to accomplish the above-mentioned objects, the invention in one aspect provides a data transmission method that puts variable length transmitted data into frames of a fixed time length and transmits these frames, comprising the steps of:

at a transmitting side,
calculating an error-detecting code of the transmitted data, frame by frame;
generating frame data containing the transmitted data and the calculated error-detecting code such that the error-detecting code is arranged after the transmitted data and bit arrangements of the transmitted data and of the error-detecting code are set in a reverse order to each other; and
transmitting the generated frame data, and at a receiving side,
receiving the frame data;
assuming the transmitted data and the error-detecting code by assuming a final bit position of the frame data, frame by frame, for the received frame data and calculating the error-detecting code of the assumed transmitted data;

deciding that among the assumed final bit positions of the frame data, a position where the assumed error-detecting code agrees with the error-detecting code calculated on the basis of the assumed transmitted data is the final bit position of the frame data; and acquiring the transmitted data on the basis of the decision result.

Optionally, the invention provides methods as disclosed herein, wherein at the transmitting side, if the number of bits of the transmitted data is zero, the step of calculating the error-detecting code considers a previously-specified bit pattern to be the error-detecting code, and at the receiving side, the step of calculating the error-detecting code also assumes a position where the number of bits of the transmitted data becomes zero as the final bit position of the frame data, and if the error-detecting code when the position where the number of bits of the transmitted data becomes zero is assumed as the final bit position of the frame data agrees with the previously-specified bit pattern, the step of deciding decides that the position where the number of bits of the transmitted data becomes zero is the final bit position of the frame data.

The invention in another aspect provides a data transmission method that puts variable length transmitted data into frames of a fixed time length and transmits these frames, comprising the steps of:

at a transmitting side, calculating an error-detecting code of the transmitted data, frame by frame;

generating frame data containing the transmitted data and the calculated error-detecting code such that the error-detecting code is arranged after the corresponding transmitted data, and bit arrangements of the transmitted data and of the error-detecting code are set in the same order; and transmitting the generated frame data, wherein if the number of bits of the transmitted data is zero, the step of calculating the error-detecting code considers a previously-specified bit pattern to be the error-detecting code, and at the receiving side, receiving the frame data;

assuming the transmitted data and the error-detecting code by assuming a final bit position of the frame data, frame by frame, for the received frame data and calculating the error-detecting code of the assumed transmitted data;

deciding that among the assumed final bit positions of the frame data, a position where the assumed error-detecting code agrees with the error-detecting code calculated on the basis of the assumed transmitted data is the final bit position of the frame data; and acquiring the transmitted data on the basis of the decision result, wherein the step of calculating the error-detecting code also assumes a position where the number of bits of the transmitted data becomes zero is also assumed as the final bit position of the frame data, and if the error-detecting code when the position where the number of bits of the transmitted data becomes zero is assumed as the final bit position of the frame data agrees with the previously-specified bit pattern the step of deciding decides that the position where the number of bits of the transmitted data becomes zero is the final bit position of the frame data.

The invention as in another aspect provides a data transmission method that puts variable length transmitted data into frames of a fixed time length and transmits these frames, comprising the steps of:

at a transmitting side, calculating an error-detecting code of the transmitted data, frame by frame;

generating frame data containing the transmitted data and the calculated error-detecting code such that the error-detecting code is arranged ahead of the corresponding transmitted data; and transmitting the generated frame data, wherein if the number of bits of the transmitted data is zero, the step of calculating the error-detecting code considers a previously-specified bit pattern to be the error-detecting code, and at a receiving side, receiving the frame data;

assuming the transmitted data and the error-detecting code by assuming a final bit position of the frame data, frame by frame, for the received frame data and calculating the error-detecting code of the assumed transmitted data;

deciding that among the assumed final bit positions of the frame data, a position where the assumed error-detecting code agrees with the error-detecting code calculated on the basis of the assumed transmitted data is the final bit position of the frame data; and acquiring the transmitted data on the basis of the decision result, wherein the step of calculating the error-detecting code also assumes a position where the number of bits of the transmitted data becomes zero as the final bit position of the frame data, and if the error-detecting code when the position where the number of bits of the transmitted data becomes zero is assumed as the final bit position of the frame data agrees with the previously-specified bit pattern, the step of deciding decides that the position where the number of bits of the transmitted data becomes zero is the final bit position of the frame data.

Optionally, the invention provides methods as disclosed herein, further comprising the steps of:

at the transmitting side, conducting error-correcting coding of the generated frame data; and conducting interleaving of the frame data that has undergone the error-correcting coding, and at the receiving side, conducting deinterleaving of the received frame data; and conducting error-correcting decoding of the frame data that has undergone the deinterleaving.

Optionally, the invention provides methods as disclosed herein wherein at the transmitting side, the step of generating the frame data generates the frame data containing a tail bit; and the step of conducting the error-correcting coding conducts the error-correcting coding with a convolutional code, and at the receiving side, the step of conducting the error-correcting decoding assumes the final bit position of the frame data, frame by frame, for the frame data that has undergone the deinterleaving, conducts the error-correcting decoding thereof by the maximum likelihood decoding method up to the assumed final bit position, and at the assumed final bit position, calculates a likelihood difference between the maximum of likelihoods of a plurality of decoded data sequences that are candidates with respect to the transmitted data sequence and a likelihood of the decoded data sequence obtained by terminating the decoding with respect to the transmitted data sequence, and the step of deciding decides that among the assumed final bit positions of the frame data, a position where the obtained likelihood difference is within a predetermined range and the assumed error-detecting code agrees with the error-detecting code calculated on the basis of the assumed transmitted data is the final bit position of the frame data.

Optionally, the invention provides methods as disclosed herein wherein at the receiving side, the predetermined range regarding the likelihood difference at the step of deciding depends on the assumed final bit position of the frame data.

The invention in another aspect provides a data transmission method that puts variable length transmitted data into frames of a fixed time length and transmits these frames, comprising the steps of:

at a transmitting side,
  calculating an error-detecting code of the transmitted data, frame by frame;
  generating frame data containing the transmitted data, the calculated error-detecting code, and a tail bit such that the error-detecting code is arranged after the corresponding transmitted data, and at the same time bit arrangements of the transmitted data and of the error-detecting code are set in the same order;
  conducting error-correcting coding of the generated frame data with a convolutional code;
  conducting interleaving of the frame data that has undergone the error-correcting coding; and
  transmitting the frame data that has undergone the interleaving, and
at a receiving side,
  receiving the frame data;
  conducting deinterleaving of the received frame data;
  assuming a final bit position of the frame data, frame by frame, for the frame data that has undergone the deinterleaving, conducting error-correcting decoding thereof by the maximum likelihood decoding method up to the assumed final bit position, and at the assumed final bit position, calculating a likelihood difference between the maximum of likelihoods of a plurality of decoded data sequences that are candidates with respect to the transmitted data sequence and a likelihood of the decoded data sequence obtained by terminating the decoding with respect to the transmitted data sequence;
  assuming the transmitted data and the error-detecting code by assuming the final bit position of the frame data, frame by frame, for the frame data that has undergone the error-correcting decoding, and calculating the error-detecting code of the assumed transmitted data;
  deciding that among the assumed final bit positions of the frame data, a position where the obtained likelihood difference is within a predetermined range and the assumed error-detecting code agrees with the error-detecting code calculated on the basis of the assumed transmitted data is the final bit position of the frame data; and
  acquiring the transmitted data on the basis of the decision result,
  wherein the predetermined range regarding the likelihood difference at the step of deciding depends on the assumed final bit position of the frame data.

The invention in another aspect provides a data transmission method that puts variable length transmitted data into frames of a fixed time length and transmits these frames, comprising the steps of:

at a transmitting side,
  calculating an error-detecting code of the transmitted data, frame by frame;
  generating frame data containing the transmitted data, the calculated error-detecting code, and a tail bit such that the error-detecting code is arranged ahead of the corresponding transmitted data;
  conducting error-correcting coding of the generated frame data with a convolutional code;
  conducting interleaving of the frame data that has undergone the error-correcting coding; and
  transmitting the frame data that has undergone the interleaving, and
at a receiving side,
  receiving the frame data;
  conducting deinterleaving of the received frame data;
  assuming a final bit position of the frame data, frame by frame, for the frame data that has undergone the deinterleaving, conducting error-correcting decoding thereof by the maximum likelihood decoding method up to the assumed final bit position, and at the assumed final bit position, calculating a likelihood difference between the maximum of likelihoods of a plurality of decoded data sequences that are candidates with respect to the transmitted data sequence and a likelihood of the decoded data sequence obtained by terminating the decoding with respect to the transmitted data sequence;
  assuming the transmitted data and the error-detecting code by assuming the final bit position of the frame data, frame by frame, for the frame data that has undergone the error-correcting decoding, and calculating the error-detecting code of the assumed transmitted data;
  deciding that among the assumed final bit positions of the frame data, a position where the obtained likelihood difference is within a predetermined range and the assumed error-detecting code agrees with the error-detecting code calculated on the basis of the assumed transmitted data is the final bit position of the frame data; and
  acquiring the transmitted data on the basis of the decision result,
  wherein the predetermined range regarding the likelihood difference at the step of deciding depends on the assumed final bit position of the frame data.

Optionally, the invention provides methods as disclosed herein further comprising the step of:
at the transmitting side,
  calculating transmission rate information indicating the number of bits of the transmitted data, frame by frame,
  wherein the step of generating the frame data generates the frame data containing the calculated transmission rate information, and at the receiving side,
wherein both the step of conducting the error-correcting decoding and the step of calculating the error-detecting code assume the final bit position of the frame data on the basis of the transmission rate information in the received frame data.

Optionally, the invention provides methods as disclosed herein, wherein at the transmitting side, the step of conducting the error-correcting coding conducts, for the transmission rate information, independent error-correcting coding that is separate from the error-correcting coding for the transmitted data, the error-detecting code, and the tail bit.

Optionally, the invention provides methods as disclosed herein wherein at the transmitting side, the step of conducting the error-correcting coding conducts the error-correcting coding of the transmission rate information by using a block code.

The invention as claimed in claim 13 is the data transmission method as claimed in claim 10, wherein at the transmitting side, the step of conducting the error-correcting coding conducts the error-correcting coding of all of the transmission rate information, the transmitted data, the error-detecting code, and the tail bit collectively with a convolutional code.

Optionally, the invention provides methods as disclosed herein wherein at the receiving side, if the step of deciding does not decide that the final bit position of the frame data assumed on the basis of the transmission rate information in the received frame data is the final bit position of the frame data, both the step of conducting the error-correcting decoding and the step of calculating the error-detecting code assume a position other than the final bit position of the frame data assumed on the basis of the transmission rate information in the received frame data as the final bit position of the frame data.

Optionally, the invention provides methods as disclosed herein, wherein at the receiving side, if among the assumed final bit positions of the frame data exist a plurality of positions where the obtained likelihood difference is within the predetermined range and the assumed error-detecting code agrees with the error-detecting code calculated on the basis of the assumed transmitted data, the step of deciding decides that a position where the obtained likelihood difference becomes the minimum is the final bit position of the frame data.

Optionally, the invention provides methods as disclosed herein, further comprising the step of:
at the transmitting side,
calculating transmission rate information indicating the number of bits of the transmitted data, frame by frame,
wherein the step of generating the frame data generates the frame data containing the calculated transmission rate information and a tail bit, and
the step of conducting the error-correcting coding conducts the error-correcting coding with a convolutional code, and
at the receiving side,
wherein the step of conducting the error-correcting decoding assumes the final bit position of the frame data on the basis of the transmission rate information in the received frame data, frame by frame, for the received frame data, and conducts the error-correcting decoding thereof by the maximum likelihood decoding method up to the assumed final bit position, and
the step of calculating the error-detecting code assumes the final bit position of the frame data on the basis of the transmission rate information in the received frame data.

Optionally, the invention provides methods as disclosed herein, wherein
at the receiving side, if the step of deciding does not decide that the final bit position of the frame data assumed on the basis of the transmission rate information in the received frame data is the final bit position of the frame data,
the step of conducting the error-correcting decoding assumes the final bit position of the frame data, frame by frame, for the received frame data, conducts the error-correcting decoding thereof by the maximum likelihood decoding method up to the assumed final bit position, and at the assumed final bit position, calculates a likelihood difference between the maximum of likelihoods of a plurality of decoded data sequences that are candidates with respect to the transmitted data sequence and a likelihood of the decoded data sequence obtained by terminating the decoding with respect to the transmitted data sequence,
both the step of conducting the error-correcting decoding and the step of calculating the error-detecting code assume a position other than the final bit position of the frame data assumed on the basis of the transmission rate information in the received frame data as the final bit position of the frame data, and
the step of deciding decides that among the assumed final bit positions of the frame data, a position where the obtained likelihood difference is within a predetermined range and the assumed error-detecting code agrees with the error-detecting code calculated on the basis of the assumed transmitted data is the final bit position of the frame data.

Optionally, the invention provides methods as disclosed herein wherein at the receiving side, the predetermined range regarding the likelihood difference at the step of determining depends on the assumed final bit position of the frame data.

The invention in another aspect provides a data transmission method that puts variable length transmitted data into frames of a fixed time length and transmits these frames, comprising the steps of:
at a transmitting side,
calculating an error-detecting code of the transmitted data, frame by frame;
calculating transmission rate information indicating the number of bits of the transmitted data, frame by frame;
generating frame data containing the calculated transmission rate information, the transmitted data, the calculated error-detecting code, and a tail bit such that the error-detecting code is arranged after the corresponding transmitted data and bit arrangements of the transmitted data and of the error-detecting code are set in the same order;
conducting error-correcting coding of the generated frame data with a convolutional code;
conducting interleaving of the frame data that has undergone the error-correcting coding; and
transmitting the frame data that has undergone the interleaving, and
at a receiving side,
receiving the frame data;

conducting deinterleaving of the received frame data;
assuming a final bit position of the frame data, frame by frame, for the frame data that has undergone the deinterleaving, and conducting error-correcting decoding thereof by the maximum likelihood decoding method up to the assumed final bit position;
assuming the transmitted data and the error-detecting code by assuming the final bit position of the frame data, frame by frame, for the frame data that has undergone the error-correcting decoding, and calculating the error-detecting code of the assumed transmitted data;
deciding that among the assumed final bit positions of the frame data, a position where an obtained likelihood difference is within a predetermined range and the assumed error-detecting code agrees with the error-detecting code calculated on the basis of the assumed transmitted data is the final bit position of the frame data; and
acquiring the transmitted data on the basis of the decision result,
wherein both the step of conducting the error-correcting decoding and the step of calculating the error-detecting code, first, assume the final bit position of the frame data on the basis of the transmission rate information in the received frame data, and if the step of deciding does not decide that the assumed position is the final bit position of the frame data,
the step of conducting the error-correcting decoding assumes the final bit position of the frame data, frame by frame, for the received frame data, conducts the error-correcting decoding thereof by the maximum likelihood decoding method up to the assumed final bit position, and at the assumed final bit position, calculates the likelihood difference between the maximum of likelihoods of a plurality of decoded data sequences that are candidates with respect to the transmitted data sequence and the likelihood of the decoded data sequence obtained by terminating the decoding with respect to the transmitted data sequence,
both the step of conducting the error-correcting decoding and the step of calculating the error-detecting code assume a position other than the final bit position of the frame data assumed on the basis of the transmission rate information in the received frame data as the final bit position of the frame data, and
the step of deciding decides that among the assumed final bit positions of the frame data, a position where the obtained likelihood difference is within the predetermined range and the assumed error-detecting code agrees with the error-detecting code calculated on the basis of the assumed transmitted data is the final bit position of the frame data, and
the predetermined range regarding the likelihood difference at the step of deciding depends on the assumed final bit position of the frame data.

The invention in another aspect provides a data transmission method that puts variable length transmitted data into frames of a fixed time length and transmits these frames, comprising the steps of:

at a transmitting side,
calculating an error-detecting code of the transmitted data, frame by frame;
calculating transmission rate information indicating the number of bits of the transmitted data, frame by frame;
generating frame data containing the calculated transmission rate information, the transmitted data, the calculated error-detecting code, and a tail bit such that the error-detecting code is arranged ahead of the corresponding transmitted data;
conducting error-correcting coding of the generated frame data with a convolutional code;
conducting interleaving of the frame data that has undergone the error-correcting coding; and
transmitting the frame data that has undergone the interleaving, and
at a receiving side,
receiving the frame data;
conducting deinterleaving of the received frame data;
assuming a final bit position of the frame data, frame by frame, for the frame data that has undergone the deinterleaving, and conducting error-correcting decoding thereof by the maximum likelihood decoding method up to the assumed final bit position;
assuming the transmitted data and the error-detecting code by assuming the final bit position of the frame data, frame by frame, for the frame data that has undergone the error-correcting decoding, and calculating the error-detecting code of the assumed transmitted data;
deciding that among the assumed final bit positions of the frame data, a position where an obtained likelihood difference is within a predetermined range and the assumed error-detecting code agrees with the error-detecting code calculated on the basis of the assumed transmitted data is the final bit position of the frame data; and
acquiring the transmitted data on the basis of the decision result,
wherein both the step of conducting the error-correcting decoding and the step of calculating the error-detecting code, first, assume the final bit position of the frame data on the basis of the transmission rate information in the received frame data, and if the step of deciding does not decide that the assumed position is the final bit position of the frame data,
the step of conducting the error-correcting decoding assumes the final bit position of the frame data, frame by frame, for the received frame data, conducts the error-correcting decoding thereof by the maximum likelihood decoding method up to the assumed final bit position, and at the assumed final bit position, calculates the likelihood difference between the maximum of likelihoods of a plurality of decoded data sequences that are candidates with respect to the transmitted data sequence and the likelihood of the decoded data sequence obtained by terminating the decoding with respect to the transmitted data sequence,
both the step of conducting the error-correcting decoding and the step of calculating the error-detecting code assume a position other than the final bit position of the frame data assumed on the basis of the transmission rate information in the received frame data as the final bit position of the frame data, and
the step of deciding decides that among the assumed final bit positions of the frame data, a position where the obtained likelihood difference is within the predetermined range and the assumed error-detecting code agrees with the error-detecting code calculated on the basis of the assumed transmitted data is the final bit position of the frame data, and the predetermined range regarding the likelihood difference at the step of deciding depends on the assumed final bit position of the frame data.

Optionally, the invention provides methods as disclosed herein wherein at the receiving side, if among the assumed final bit positions of the frame data exist a plurality of positions where the obtained likelihood difference is within the predetermined range and at the same time the assumed error-detecting code agrees with the error-detecting code calculated on the basis of the assumed transmitted data, the step of deciding decides that a position where the obtained likelihood difference becomes the minimum is the final bit position of the frame data.

Optionally, the invention provides methods as disclosed herein, wherein at the transmitting side, the step of conducting the error-correcting coding conducts, for the transmission rate information, independent error-correcting coding that is separate from the error-correcting coding for the transmitted data, the error-detecting code, and the tail bit.

Optionally, the invention provides methods as disclosed herein wherein at the transmitting side, the step of conducting the error-correcting coding conducts the error-correcting coding of the transmission rate information by using a block code.

Optionally, the invention provides methods as disclosed herein, wherein at the transmitting side, the step of conducting the error-correcting coding conducts the error-correcting coding of all of the transmission rate information, the transmitted data, the error-detecting code, and the tail bit collectively with a convolutional code.

Optionally, the invention provides methods as disclosed herein, wherein the error-detecting code is a CRC code.

The invention in another aspect provides a data transmission system that puts variable length transmitted data into frames of a fixed time length and transmits these frames, comprising:

in a transmitter,
means for calculating an error-detecting code of the transmitted data, frame by frame;
means for generating frame data containing the transmitted data and the calculated error-detecting code such that the error-detecting code is arranged after the corresponding transmitted data and bit arrangements of the transmitted data and of the error-detecting code are set in a reverse order to each other; and
means for transmitting the generated frame data, and
in a receiver,
means for receiving the frame data;
means for assuming the transmitted data and the error-detecting code by assuming a final bit position of the frame data, frame by frame, for the received frame data, and calculating the error-detecting code of the assumed transmitted data;
means for deciding that among the assumed final bit positions of the frame data, a position where the assumed error-detecting code agrees with the error-detecting code calculated on the basis of the assumed transmitted data is the final bit position of the frame data; and
means for acquiring the transmitted data on the basis of the decision result.

Optionally, the invention provides systems as disclosed herein, wherein
in the transmitter,
if the number of bits of the transmitted data is zero, the means for calculating the error-detecting code considers a previously-specified bit pattern to be the error-detecting code, and
in the receiver,
the means for calculating the error-detecting code also assumes a position where the number of bits of the transmitted data becomes zero as the final bit position of the frame data, and
if the error-detecting code when the position where the number of bits of the transmitted data becomes zero is assumed as the final bit position of the frame data agrees with the previously-specified bit pattern, the means for deciding decides that the position where the number of bits of the transmitted data becomes zero is the final bit position of the frame data.

The invention in another aspect provides a data transmission system that puts variable length transmitted data into frames of a fixed time length and transmits these frames, comprising:

in a transmitter,
means for calculating an error-detecting code of the transmitted data, frame by frame;
means for generating frame data containing the transmitted data and the calculated error-detecting code such that the error-detecting code is arranged after the corresponding transmitted data and bit arrangements of the transmitted data and of the error-detecting code are set in the same order; and
means for transmitting the generated frame data,
wherein, if the number of bits of the transmitted data is zero, the means for calculating the error-detecting code considers a previously-specified bit pattern to be the error-detecting code, and
in a receiver,
means for receiving the frame data;
means for assuming the transmitted data and the error-detecting code by assuming a final bit position of the frame data, frame by frame, for the received frame data, and calculating the error-detecting code of the assumed transmitted data;
means for deciding that among the assumed final bit positions of the frame data, a position where the assumed error-detecting code agrees with the error-detecting code calculated on the basis of the assumed transmitted data is the final bit position of the frame data; and
means for acquiring the transmitted data on the basis of the decision result,
wherein the means for calculating the error-detecting code also assumes a position where the number of bits of the transmitted data becomes zero as the final bit position of the frame data, and
if the error-detecting code when the position where the number of bits of the transmitted data becomes zero is assumed as the final bit position of the frame data agrees with the previously-specified bit pattern, the means for deciding decides that the position where the number of bits of the transmitted data becomes zero is the final bit position of the frame data.

The invention in another aspect provides data transmission system that puts variable length transmitted data into frames of a fixed time length and transmits these frames, comprising:

in a transmitter,
  means for calculating an error-detecting code of the transmitted data, frame by frame;
  means for generating frame data containing the transmitted data and the calculated error-detecting code such that the error-detecting code is arranged ahead of the corresponding transmitted data; and
  means for transmitting the generated frame data,
  wherein if the number of bits of the transmitted data is zero, the means for calculating the error-detecting code considers a previously-specified bit pattern to be the error-detecting code, and
in a receiver,
  means for receiving the frame data;
  means for assuming the transmitted data and the error-detecting code by assuming a final bit position of the frame data, frame by frame, for the received frame data, and calculating the error-detecting code of the assumed transmitted data;
  means for deciding that among the assumed final bit positions of the frame data, a position where the assumed error-detecting code agrees with the error-detecting code calculated on the basis of the assumed transmitted data is the final bit position of the frame data; and
  means for acquiring the transmitted data on the basis of the decision result,
  wherein the means for calculating the error-detecting code also assumes a position where the number of bits of the transmitted data becomes zero as the final bit position of the frame data, and
  if the error-detecting code when the position where the number of bits of the transmitted data becomes zero is assumed as the final bit position of the frame data agrees with the previously-specified bit pattern, the means for deciding decides that the position where the number of bits of the transmitted data becomes zero is the final bit position of the frame data.

Optionally, the invention provides systems as disclosed herein, further comprising:
in the transmitter,
  means for conducting error-correcting coding of the generated frame data; and
  means for conducting interleaving of the frame data that has undergone the error-correcting coding, and
in the receiver,
  means for conducting deinterleaving of the received frame data; and
  means for conducting error-correcting decoding of the frame data that has undergone the deinterleaving.

Optionally, the invention provides systems as disclosed herein, wherein
in the transmitter,
  the means for generating the frame data generates the frame data containing a tail bit, and
  the means for conducting the error-correcting coding conducts the error-correcting coding with a convolutional code, and
in the receiver,
  the means for conducting the error-correcting decoding assumes the final bit position of the frame data, frame by frame, for the frame data that has undergone the deinterleaving, conducts the error-correcting decoding thereof by the maximum likelihood decoding method up to the assumed final bit position, and at the assumed final bit position, calculates a likelihood difference between the maximum of likelihoods of a plurality of decoded data sequences that are candidates with respect to the transmitted data sequence and a likelihood of the decoded data sequence obtained by terminating the decoding with respect to the transmitted data sequence; and
  the means for deciding decides that among the assumed final bit positions of the frame data, a position where the obtained likelihood difference is within a predetermined range and the assumed error-detecting code agrees with the error-detecting code calculated on the basis of the assumed transmitted data is the final bit position of the frame data.

Optionally, the invention provides systems as disclosed herein, wherein in the receiver, the predetermined range regarding the likelihood difference at the means for deciding depends on the assumed final bit position of the frame data.

The invention in another aspect provides a data transmission system that puts variable length transmitted data into frames of a fixed time length and transmits these frames, comprising:
in a transmitter,
  means for calculating an error-detecting code of the transmitted data, frame by frame;
  means for generating frame data containing the transmitted data, the calculated error-detecting code, and a tail bit such that the error-detecting code is arranged after the corresponding transmitted data and bit arrangements of the transmitted data and of the error-detecting code are set in the same order;
  means for conducting error-correcting coding of the generated frame data with a convolutional code;
  means for conducting interleaving of the frame data that has undergone the error-correcting coding; and
  means for transmitting the frame data that has undergone the interleaving, and
in a receiver,
  means for receiving the frame data;
  means for conducting deinterleaving of the received frame data;
  means for assuming a final bit position of the frame data, frame by frame, for the frame data that has undergone the deinterleaving, conducting error-correcting decoding thereof by the maximum likelihood decoding method up to the assumed final bit position, and at the assumed final bit position, calculating a likelihood difference between the maximum of likelihoods of a plurality of decoded data sequences that are candidates with respect to the transmitted data sequence and a likelihood of the decoded data sequence obtained by terminating the decoding with respect to the transmitted data sequence;
  means for assuming the transmitted data and the error-detecting code by assuming the final bit position of the frame data, frame by frame, for the frame data that has undergone the error-correcting decoding, and calculating the error-detecting code of the assumed transmitted data;
  means for deciding that among the assumed final bit positions of the frame data, a position where the obtained likelihood difference is within a predetermined range and the assumed error-detecting code agrees with the error-detecting code calculated on the basis of the assumed transmitted data is the final bit position of the frame data; and
  means for acquiring the transmitted data on the basis of the decision result, wherein the predetermined range regarding the likelihood difference in the means for deciding depends on the assumed final bit position of the frame data.

The invention in another aspect provides a data transmission system that puts variable length transmitted data into frames of a fixed time length and transmits these frames, comprising:

in a transmitter,
means for calculating an error-detecting code of the transmitted data, frame by frame;
means for generating frame data containing the transmitted data, the calculated error-detecting code, and a tail bit such that the error-detecting code is arranged ahead of the corresponding transmitted data;
means for conducting error-correcting coding of the generated frame data with a convolutional code;
means for conducting interleaving of the frame data that has undergone the error-correcting coding; and
means for transmitting the frame data that has undergone the interleaving, and in a receiver,
means for receiving the frame data;
means for conducting deinterleaving of the received frame data;
means for assuming a final bit position of the frame data, frame by frame, for the frame data that has undergone the deinterleaving, conducting error-correcting decoding thereof by the maximum likelihood decoding method up to the assumed final bit position, and at the assumed final bit position, calculating a likelihood difference between the maximum of likelihoods of a plurality of decoded data sequences that are candidates with respect to the transmitted data sequence and a likelihood of the decoded data sequence obtained by terminating the decoding with respect to the transmitted data sequence;
means for assuming the transmitted data and the error-detecting code by assuming the final bit position of the frame data, frame by frame, for the frame data that has undergone the error-correcting decoding, and calculating the error-detecting code of the assumed transmitted data;
means for deciding that among the assumed final bit positions of the frame data, a position where the obtained likelihood difference is within a predetermined range and the assumed error-detecting code agrees with the error-detecting code calculated on the basis of the assumed transmitted data is the final bit position of the frame data; and
means for acquiring the transmitted data on the basis of the decision result,
wherein the predetermined range regarding the likelihood difference at the means for deciding depends on the assumed final bit position of the frame data.

Optionally, the invention provides systems as disclosed herein, further comprising:

in the transmitter,
means for calculating transmission rate information indicating the number of bits of the transmitted data, frame by frame,
wherein the means for generating the frame data generates the frame data containing the calculated transmission rate information, and in the receiver,
wherein both the means for conducting the error-correcting decoding and the means for calculating the error-detecting code assume the final bit position of the frame data on the basis of the transmission rate information in the received frame data.

Optionally, the invention provides systems as disclosed herein, wherein in the transmitter, the means for conducting the error-correcting coding conducts, for the transmission rate information, independent error-correcting coding that is separate from the error-correcting coding for the transmitted data, the error-detecting code, and the tail bit.

Optionally, the invention provides systems as disclosed herein, wherein in the transmitter, the means for conducting the error-correcting coding conducts the error-correcting coding of the transmission rate information by using a block code.

Optionally, the invention provides sytems as disclosed herein, wherein in the transmitter, the means for conducting the error-correcting coding conducts the error-correcting coding of all of the transmission rate information, the transmitted data, the error-detecting code, and the tail bit collectively with a convolutional code.

Optionally, the invention provides systems as disclosed herein, wherein in the receiver, if the means for deciding does not decide that the final bit position of the frame data assumed on the basis of the transmission rate information in the received frame data is the final bit position of the frame data, both the means for conducting the error-correcting decoding and the means for calculating the error-detecting code assume a position other than the final bit position of the frame data assumed on the basis of the transmission rate information in the received frame data as the final bit position of the frame data.

Optionally, the invention provides systems as disclosed herein wherein in the receiver, if among the assumed final bit positions of the frame data exist a plurality of positions where the obtained likelihood difference is within the predetermined range and the assumed error-detecting code agrees with the error-detecting code calculated on the basis of the assumed transmitted data, the means for deciding decides that a position where the obtained likelihood difference becomes the minimum is the final bit position of the frame data.

Optionally, the invention provides systems as disclosed herein, further comprising:

in the transmitter,
means for calculating transmission rate information indicating the number of bits of the transmitted data, frame by frame,
wherein the means for generating the frame data generates the frame data containing the calculated transmission rate information and a tail bit, and
the means for conducting the error-correcting coding conducts the error-correcting coding with a convolutional code, and in the receiver,
wherein the means for conducting the error-correcting decoding assumes the final bit position of the frame data on the basis of the transmission rate information in the received frame data, frame by frame, for the received frame data, and conducts the error-correcting decoding thereof by the maximum likelihood decoding method up to the assumed final bit position, and
the means for calculating the error-detecting code assumes the final bit position of the frame data on the basis of the transmission rate information in the received frame data.

Optionally, the invention provides systems as disclosed herein, wherein:

in the receiver, if the means for deciding does not decide that the final bit position of the frame data assumed on the basis of the transmission rate information in the received frame data is the final bit position of the frame data, the means for conducting the error-correcting decoding assumes the final bit position of the frame data, frame by frame, for the received frame data, conducts the error-correcting decoding thereof by the maximum likelihood decoding method up to the assumed final bit position, and at the assumed final bit position, calculates a likelihood difference between the maximum of likelihoods of a plurality of decoded data sequences that are candidates with respect to the transmitted data sequence and a likelihood of the decoded data sequence obtained by terminating the decoding with respect to the transmitted data sequence, both the means for conducting the error-correcting decoding and the means for calculating the error-detecting code assume a position other than the final bit position of the frame data assumed on the basis of the transmission rate information in the received frame data as the final bit position of the frame data, and the means for deciding decides that among the assumed final bit positions of the frame data, a position where the obtained likelihood difference is within a predetermined range and the assumed error-detecting code agrees with the error-detecting code calculated on the basis of the assumed transmitted data is the final bit position of the frame data.

Optionally, the invention provides systems as disclosed herein, wherein in the receiver, the predetermined range regarding the likelihood difference at the means for determining depends on the assumed final bit position of the frame data.

The invention in another aspect provides a data transmission system that puts variable length transmitted data into frames of a fixed time length and transmits these frames, comprising:

in a transmitter, means for calculating an error-detecting code of the transmitted data, frame by frame;

means for calculating transmission rate information indicating the number of bits of the transmitted data, frame by frame;

means for generating frame data containing the calculated transmission rate information, the transmitted data, the calculated error-detecting code, and a tail bit such that the error-detecting code is arranged after the corresponding transmitted data and bit arrangements of the transmitted data and of the error-detecting code are set in the same order;

means for conducting error-correcting coding of the generated frame data with a convolutional code;

means for conducting interleaving of the frame data that has undergone the error-correcting coding; and means for transmitting the frame data that has undergone the interleaving, and in a receiver, means for receiving the frame data;

means for conducting deinterleaving of the received frame data;

means for assuming a final bit position of the frame data, frame by frame, for the frame data that has undergone the deinterleaving, and conducting error-correcting decoding thereof by the maximum likelihood decoding method up to the assumed final bit position;

means for assuming the transmitted data and the error-detecting code by assuming the final bit position of the frame data, frame by frame, for the frame data that has undergone the error-correcting decoding, and calculating the error-detecting code of the assumed transmitted data;

means for deciding that among the assumed final bit positions of the frame data, a position where an obtained likelihood difference is within a predetermined range and the assumed error-detecting code agrees with the error-detecting code calculated on the basis of the assumed transmitted data is the final bit position of the frame data; and means for acquiring the transmitted data on the basis of the decision result, wherein the means for conducting the error-correcting decoding and the means for calculating the error-detecting code first assume the final bit position of the frame data on the basis of the transmission rate information in the received frame data, and if the means for deciding does not decide that the assumed position is the final bit position of the frame data, the means for conducting the error-correcting decoding assumes the final bit position of the frame data, frame by frame, for the received frame data, conducts the error-correcting decoding thereof by the maximum likelihood decoding method up to the assumed final bit position, and at the assumed final bit position, calculates the likelihood difference between the maximum of likelihoods of a plurality of decoded data sequences that are candidates with respect to the transmitted data sequence and a likelihood of the decoded data sequence obtained by terminating the decoding with respect to the transmitted data sequences, both the means for conducting the error-correcting decoding and the means for calculating the error-detecting code assume a position other than the final bit position of the frame data assumed on the basis of the transmission rate information in the received frame data as the final bit position of the frame data, and the means for deciding decides that among the assumed final bit positions of the frame data, a position where the obtained likelihood difference is within the predetermined range and the assumed error-detecting code agrees with the error-detecting code calculated on the basis of the assumed transmitted data is the final bit position of the frame data, and the predetermined range regarding the likelihood difference at the means for deciding depends on the assumed final bit position of the frame data.

The invention in another aspect provides a data transmission system that puts variable length transmitted data into frames of a fixed time length and transmits these frames, comprising:

in a transmitter, means for calculating an error-detecting code of the transmitted data, frame by frame;

means for calculating transmission rate information indicating the number of bits of the transmitted data, frame by frame;

means for generating frame data containing the calculated transmission rate information, the transmitted data, the calculated error-detecting code, and a tail bit such that the error-detecting code is arranged ahead of the corresponding transmitted data;

means for conducting error-correcting coding of the generated frame data with a convolutional code;

means for conducting interleaving of the frame data that has undergone the error-correcting coding; and means for transmitting the frame data that has undergone the interleaving, and in a transmitter, means for receiving the frame data;

means for conducting deinterleaving of the received frame data;

means for assuming a final bit position of the frame data, frame by frame, for the frame data that has undergone the deinterleaving, and conducting error-correcting decoding thereof by the maximum likelihood decoding method up to the assumed final bit position;

means for assuming the transmitted data and the error-detecting code by assuming the final bit position of the frame data, frame by frame, for the frame data that has undergone the error-correcting decoding, and calculating the error-detecting code of the assumed transmitted data;

means for deciding that among the assumed final bit positions of the frame data, a position where an obtained likelihood difference is within a predetermined range and the assumed error-detecting code agrees with an error-detecting code calculated on the basis of the assumed transmitted data is the final bit position of the frame data; and means for acquiring the transmitted data on the basis of the decision result, wherein both the means for conducting the error-correcting decoding and the means for calculating the error-detecting code first assume the final bit position of the frame data on the basis of the transmission rate information in the received frame data, and if the means for deciding does not decide that the assumed position is the final bit position of the frame data, the means for conducting error-correcting decoding assumes the final bit position of the frame data, frame by frame, for the received frame data, conducts the error-correcting decoding thereof by the maximum likelihood decoding method up to the assumed final bit position, and at the assumed final bit position, calculates the likelihood difference between the maximum of likelihoods of a plurality of decoded data sequences that are candidates with respect to the transmitted data sequence and a likelihood of the decoded data sequence obtained by terminating the decoding with respect to the transmitted data sequence;

both the means for conducting the error-correcting decoding and the means for calculating the error-detecting code assume a position other than the assumed final bit position of the frame data assumed on the basis of the transmission rate information in the received frame data as the final bit position of the frame data; and the means for determining determines that among the assumed final bit positions of the frame data, a position where the obtained likelihood difference is within the predetermined range and the assumed error-detecting code agrees with an error-detecting code calculated on the basis of the assumed transmitted data is the final bit position of the frame data, and the predetermined range regarding the likelihood difference at the means for deciding depends on the assumed final bit position of the frame data.

Optionally, the invention provides systems as disclosed herein, wherein in the receiver, if among the assumed final bit positions of the frame data exist a plurality of positions where the obtained likelihood difference is within the predetermined range and the assumed error-detecting code agrees with the error-detecting code calculated on the basis of the assumed transmitted data, the means for deciding decides that a position where the obtained likelihood difference becomes the minimum is the final bit position of the frame data.

Optionally, the invention provides systems as disclosed herein, wherein in the transmitter, the means for conducting the error-correcting coding conducts, for the transmission rate information, independent error-correcting coding that is separate from the error-correcting coding for the transmitted data, the error-detecting code, and the tail bit.

Optionally, the invention provides systems as disclosed herein wherein in the transmitter, the means for conducting the error-correcting coding conducts the error-correcting coding of the transmission rate information by using a block code.

Optionally, the invention provides systems as disclosed herein, wherein in the transmitter, the means for conducting the error-correcting coding conducts the error-correcting coding of all of the transmission rate information, the transmitted data, the error-detecting code, and the tail bit collectively with a convolutional code.

Optionally, the invention provides systems as disclosed herein wherein the error-detecting code is a CRC code.

The invention in another aspect provides a transmitter that puts variable length transmitted data into frames of a fixed time length and transmits these frames, comprising:

means for calculating an error-detecting code of the transmitted data, frame by frame;

means for generating frame data containing the transmitted data and the calculated error-detecting code such that the error-detecting code is arranged after the corresponding transmitted data and bit arrangements of the transmitted data and of the error-detecting code are set in a reverse order to each other; and means for transmitting the generated frame data.

The invention in another aspect provides a transmitter that puts variable length transmitted data into frames of a fixed time length and transmits these frames, comprising:

means for calculating an error-detecting code of the transmitted data, frame by frame;

means for generating frame data containing the transmitted data and the calculated error-detecting code such that the error-detecting code is arranged after the corresponding transmitted data and bit arrangements of the transmitted data and of the error-detecting code are set in the same order; and means for transmitting the generated frame data, wherein if the number of bits of the transmitted data is zero, the means for calculating the error-detecting code considers a previously-specified bit pattern to be the error-detecting code.

The invention in another aspect provides a transmitter that puts variable length transmitted data into frames of a fixed time length and transmits these frames, comprising:

means for calculating an error-detecting code of the transmitted data, frame by frame;

means for generating frame data containing the transmitted data and the calculated error-detecting code such that the error-detecting code is arranged ahead of the corresponding transmitted data; and means for transmitting the generated frame data, wherein if the number of bits of the transmitted data is zero, the means for calculating the error-detecting code considers a previously-specified bit pattern to be the error-detecting code.

The invention in another aspect provides a receiver for receiving frame data containing variable length transmitted data, and an error-detecting code calculated, frame by frame, for the transmitted data in each frame of a fixed time length such that the error-detecting code is arranged after the corresponding transmitted data, and bit arrangements of the transmitted data and of the error-detecting code are set in a reverse order to each other, comprising:

means for receiving the frame data;

means for assuming the transmitted data and the error-detecting code by assuming a final bit position of the frame data, frame by frame, for the received frame data, and calculating the error-detecting code of the assumed transmitted data;

means for deciding that among the assumed final bit positions of the frame data, a position where the assumed error-detecting code agrees with the error-detecting code calculated on the basis of the assumed transmitted data is the final bit position of the frame data; and means for acquiring the transmitted data on the basis of the decision result.

The invention in another aspect provides a receiver for receiving frame data containing variable length transmitted data and an error-detecting code calculated, frame by frame, for the transmitted data in each frame of a fixed time length such that the error-detecting code is arranged after the corresponding transmitted data, bit arrangements of the transmitted data and of the error-detecting code are set in the same order, and if the number of bits of the transmitted data is zero, a previously-specified bit pattern is considered to be the error-detecting code, comprising:

means for receiving the frame data;

means for assuming the transmitted data and the error-detecting code by assuming a final bit position of the frame data, frame by frame, for the received frame data, and calculating the error-detecting code of the assumed transmitted data;

means for deciding that among the assumed final bit positions of the frame data, a position where the assumed error-detecting code agrees with the error-detecting code calculated on the basis of the assumed transmitted data is the final bit position of the frame data; and means for acquiring the transmitted data on the basis of the decision result, wherein the means for calculating the error-detecting code also assumes a position where the number of bits of the transmitted data becomes zero as the final bit position of the frame data, and if the error-detecting code when the position where the number of bits of the transmitted data becomes zero is assumed as the final bit position of the frame data agrees with the previously-specified bit pattern, the means for determining determines that the position where the number of bits of the transmitted data becomes zero is the final bit position of the frame data.

The invention in another aspect provides a receiver for receiving frame data containing variable length transmitted data and an error-detecting code calculated, frame by frame, for the transmit data in each frame of a fixed time length such that the error-detecting code is arranged ahead of the corresponding transmitted data, and if the number of bits of the transmitted data is zero, a previously-specified bit pattern is considered to be the error-detecting code, comprising:

means for receiving the frame data;

means for assuming the transmitted data and the error-detecting code by assuming a final bit position of the frame data, frame by frame, for the received frame data, and calculating the error-detecting code of the assumed transmitted data;

means for deciding that among the assumed final bit positions of the frame data, a position where the assumed error-detecting code agrees with the error-detecting code calculated on the basis of the assumed transmitted data is the final bit position of the frame data; and means for acquiring the transmitted data on the basis of the decision result, wherein the means for calculating the error-detecting code also assumes a position where the number of bits of the transmitted data becomes zero as the final bit position of the frame data, and if the error-detecting code when the position where the number of bits of the transmitted data becomes zero is assumed as the final bit position of the frame data agrees with the previously-specified bit pattern, the means for deciding decides that the position where the number of bits of the transmitted data becomes zero is the final bit position of the frame data.

The invention in another aspect provides a receiver for receiving frame data containing variable length transmitted data, an error-detecting code calculated, frame by frame, for the transmitted data, and a tail bit in each frame of a fixed time length such that the error-detecting code is arranged after the corresponding transmitted data, bit arrangements of the transmitted data and of the error-detecting code are set in the same order, if the number of bits of the transmitted data is zero, the previously-specified bit pattern is considered to be the error-detecting code, and the frame data has undergone error-correcting coding with a convolutional code and interleaving, comprising:

means for receiving the frame data;

means for conducting deinterleaving of the received frame data;

means for assuming a final bit position of the frame data, frame by frame, for the frame data that has undergone the deinterleaving, conducting error-correcting decoding thereof by the maximum likelihood decoding method up to the assumed final bit position, and at the assumed final bit position, calculating a likelihood difference between the maximum of likelihoods of a plurality of decoded data sequences that are candidates with respect to the transmitted data sequence and a likelihood of the decoded data sequence obtained by terminating the decoding with respect to the transmitted data sequence;

means for assuming the transmitted data and the error-detecting code by assuming the final bit position of the frame data, frame by frame, for the frame data that has undergone the error-correcting decoding, and calculating the error-detecting code of the assumed transmitted data;

means for deciding that among the assumed final bit positions of the frame data, a position where the obtained likelihood difference is within a predetermined range and the assumed error-detecting code agrees with the error-detecting code calculated on the basis of the assumed transmitted data is the final bit position of the frame data; and means for acquiring the transmitted data on the basis of the decision result, wherein the predetermined range regarding the likelihood difference at the means for deciding depends on the assumed final bit position of the frame data.

The invention in another aspect provides a receiver for receiving frame data containing variable length transmitted data, an error-detecting code calculated, frame by frame, for the transmitted data, and a tail bit in each frame of a fixed time length such that the error-detecting code is arranged ahead of the corresponding transmitted data, if the number of bits of the transmitted data is zero, a previously-specified bit pattern is considered to be the error-detecting code, and the frame data has undergone error-correcting coding with a convolutional code and interleaving, comprising:

means for receiving the frame data;

means for conducting deinterleaving of the received frame data;

means for assuming a final bit position of the frame data, frame by frame, for the frame data that has undergone the deinterleaving, conducting error-correcting decoding thereof by the maximum likelihood decoding method up to the assumed final bit position, and at the assumed final bit position, calculating a likelihood difference between the maximum of likelihoods of a plurality of decoded data sequences that are candidates with respect to the transmitted data sequence and a likelihood of the decoded data sequence obtained by terminating the decoding with respect to the transmitted data sequence;

means for assuming the transmitted data and the error-detecting code by assuming the final bit position of the frame data, frame by frame, for the frame data that has undergone the error-correcting decoding, and calculating the error-detecting code of the assumed transmitted data;

means for deciding that among the assumed final bit positions of the frame data, a position where the obtained likelihood difference is within a predetermined range and the assumed error-detecting code agrees with the error-detecting code calculated on the basis of the assumed transmitted data is the final bit position of the frame data; and means for acquiring the transmitted data on the basis of the decision result, wherein the predetermined range regarding the likelihood difference at the means for deciding depends on the assumed final bit position of the frame data.

The invention in another aspect provides a receiver for receiving frame data containing variable length transmitted data, transmission rate information indicating the number of bits of the transmitted data calculated, frame by frame, for the transmitted data, an error-detecting code calculated, frame by frame, for the transmitted data, and a tail bit in each frame of a fixed time length such that the error-detecting code is arranged after the corresponding transmitted data, bit arrangements of the transmitted data and of the error-detecting code are set in the same order, if the number of bits of the transmitted data is zero, a previously-specified bit pattern is considered to be the error-detecting code, and the frame data has undergone error-correcting coding with a convolutional code and interleaving, comprising:

means for receiving the frame data;

means for conducting deinterleaving of the received frame data;

means for assuming a final bit position of the frame data, frame by frame, for the frame data that has undergone the deinterleaving, and conducting error-correcting decoding thereof by the maximum likelihood decoding method up to the assumed final bit position;

means for assuming the transmitted data and the error-detecting code by assuming the final bit position of the frame data, frame by frame, for the frame data that has undergone the error-correcting decoding, and calculating the error-detecting code of the assumed transmitted data;

means for deciding that among the assumed final bit positions of the frame data, a position where an obtained likelihood difference is within a predetermined range and at the same time the assumed error-detecting code agrees with an error-detecting code calculated on the basis of the assumed transmitted data is the final bit position of the frame data; and means for acquiring the transmitted data on the basis of the decision result, wherein both the means for conducting the error-correcting decoding and the means for calculating the error-detecting code first assume the final bit position of the frame data on the basis of the transmission rate information in the received frame data, and if the means for deciding does not decide that the assumed position is the final bit position of the frame data, the means for conducting the error-correcting decoding assumes the final bit position of the frame data, frame by frame, for the received frame data, conducts the error-correcting decoding thereof by the maximum likelihood decoding method up to the assumed final bit position, and at the assumed final bit position, calculates the likelihood difference between the maximum of likelihoods of a plurality of decoded data sequences that are candidates with respect to the transmitted data sequence and a likelihood of the decoded data sequence obtained by terminating the decoding with respect to the transmitted data sequence, both the means for conducting the error-correcting decoding and the means for calculating the error-detecting code assume a position other than the final bit position of the frame data assumed on the basis of the transmission rate information in the received frame data as the final bit position of the frame data, and the means for deciding decides that among the assumed final bit positions of the frame data, a position where the obtained likelihood difference is within the predetermined range and the assumed error-detecting code agrees with an error-detecting code calculated on the basis of the assumed transmitted data is the final bit position of the frame data, and the predetermined range regarding the likelihood difference at the means for determining depends on the assumed final bit position of the frame data.

The invention in another aspect provides a receiver for receiving frame data containing variable length transmitted data, transmission rate information indicating the number of bits of the transmitted data calculated, frame by frame, for the transmitted data, an error-detecting code calculated, frame by frame, for the transmitted data, and a tail bit in each frame of a fixed time length such that the error-detecting code is arranged ahead of the corresponding transmitted data, if the number of bits of the transmitted data is zero, a previously-specified bit pattern is considered to be the error-detecting code, and the frame data has undergone error-correcting coding with a convolutional code and interleaving, comprising:

means for receiving the frame data;

means for conducting deinterleaving of the received frame data;

means for assuming a final bit position of the frame data, frame by frame, for the frame data that has undergone the deinterleaving, and conducting error-correcting decoding thereof by the maximum likelihood decoding method up to the assumed final bit position;

means for assuming the transmitted data and the error-detecting code by assuming the final bit position of the frame data, frame by frame, for the frame data that has undergone the error-correcting decoding, and calculating the error-detecting code of the assumed transmitted data;

means for deciding that among the assumed final bit positions of the frame data, a position where an obtained likelihood difference is within a predetermined range and at the same time the assumed error-detecting code agrees with an error-detecting code calculated on the basis of the assumed transmitted data is the final bit position of the frame data; and means for acquiring the transmitted data on the basis of the decision result, wherein both the means for conducting the error-correcting decoding and the means for calculating the error-detecting code first assume the final bit position of the frame data on the basis of the transmission rate information in the received frame data, and if the means for deciding does not decide that the assumed position is the final bit position of the frame data, the means for conducting the error-correcting decoding assumes the final bit position of the frame data, frame by frame, for the received frame data, conducts the error-correcting decoding thereof by the maximum likelihood decoding method up to the assumed final bit position, and at the assumed final bit position, calculates the likelihood difference between the maximum of likelihoods of a plurality of decoded data sequences that are candidates with respect to the transmitted data sequence and a likelihood of the decoded data sequence obtained by terminating the decoding with respect to the transmitted data sequence, both the means for conducting the error-correcting decoding and the means for calculating the error-detecting code assume a position other than the final bit position of the frame data assumed on the basis of the transmission rate information in the received frame data as the final bit position of the frame data, and the means for deciding decides that among the assumed final bit positions of the frame data, a position where the obtained likelihood difference is within the predetermined range and the assumed error-detecting code agrees with the error-detecting code calculated on the basis of the assumed transmitted data is the final bit position of the frame data, and the predetermined range regarding the likelihood difference at the means for determining depends on the assumed final bit position of the frame data.

According to the foregoing configuration, in the variable rate data transmission, the need for providing buffer for temporarily storing the transmitted data at the transmitting side can be eliminated while holding down the probability of detecting the rate mistakenly at the receiving side.

Moreover, in the broad area of communication environments and variable rate conditions, a high-efficiency and high-quality variable rate data transmission is made possible.

BRIEF DESCRIPTION OF THE DRAWINGS

FIGS. 1A and 1B are diagrams showing examples of transmission bit arrangements of the conventional scheme;

FIGS. 2A and 2B are diagrams showing examples of the transmission bit arrangement of the conventional scheme and of the transmission bit arrangement according to the present invention;

FIGS. 4A and 4B are diagrams showing examples of frame configurations of the transmitted data in the first embodiment according to the present invention;

FIG. 9 is a diagram showing relationship between FIGS. 9A and 9B;

FIGS. 11A and 11B are diagrams showing examples of the frame configurations of the transmitted data in the second embodiment according to the present invention;

FIGS. 14A and 14B are diagrams showing examples of the frame configurations of the transmitted data in the case of the "postposition and same order";

FIGS. 15A and 15B are diagrams showing examples of the frame configuration of the transmitted data in the case of the "preposition"

BEST MODE FOR CARRYING OUT THE INVENTION

Hereafter, preferred embodiments to implement the present invention will be described in detail with reference to the drawings.

FIRST EMBODIMENT

Figure 3A:
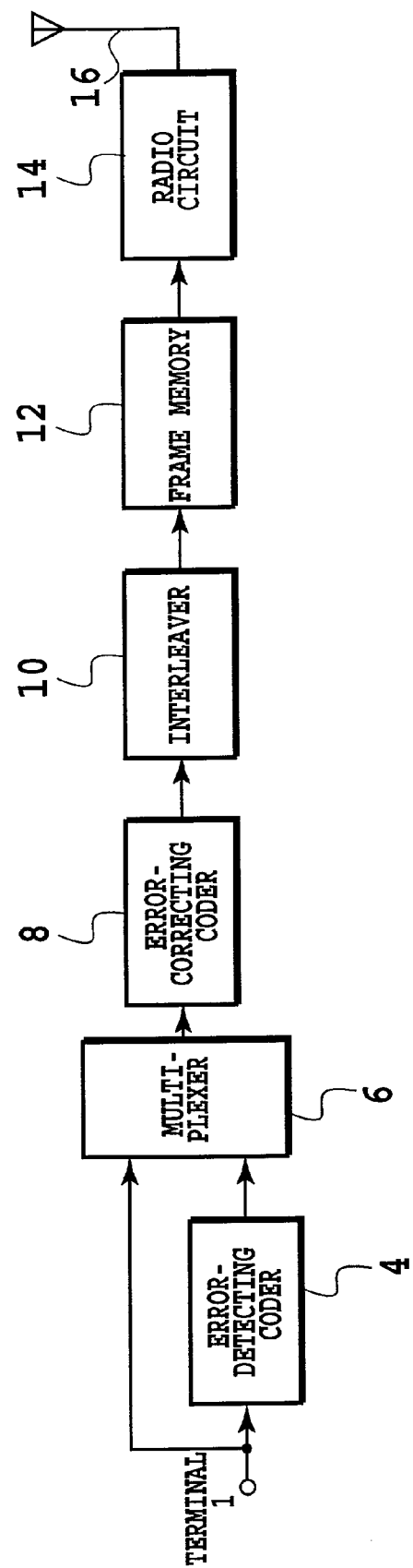
FIGS. 3A and 3B are block diagrams showing examples of configurations of a transmitter and a receiver in a first embodiment according to the present invention.
Figure 3B:
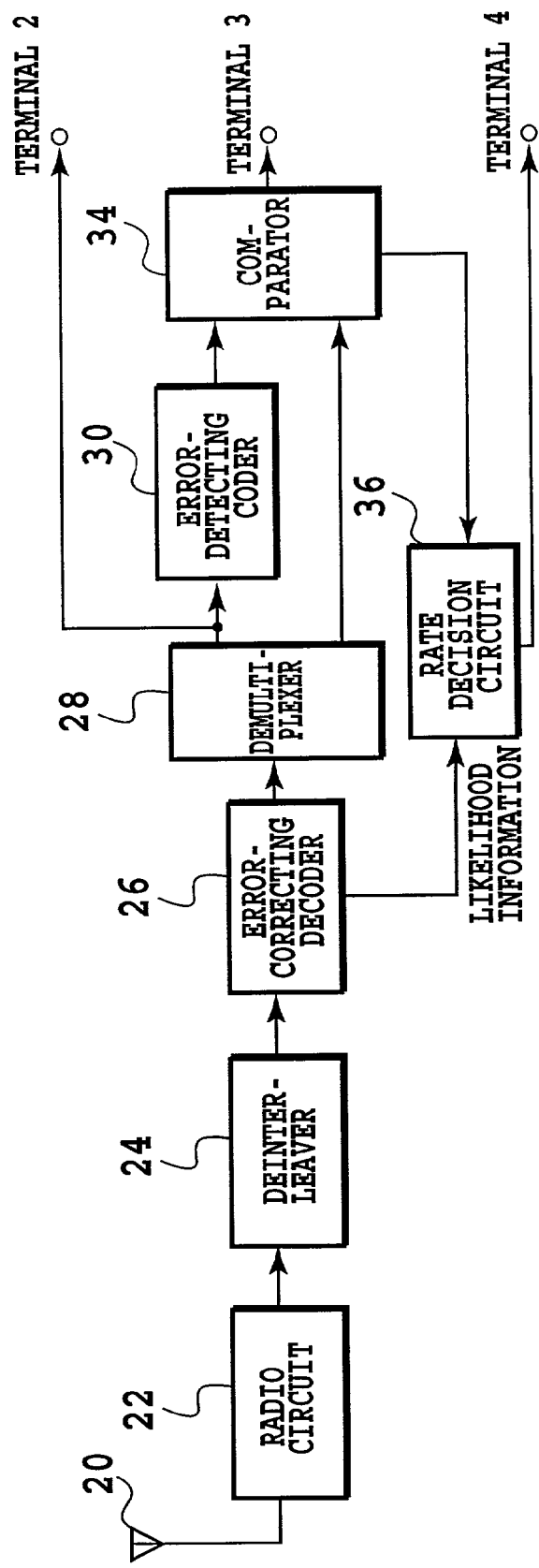

FIGS. 3A and 3B show examples of block constructs of a transmitter and a receiver in a first embodiment of the present invention.

In FIGS. 3A and 3B, a transmitted data sequence applied to a terminal 1 is sent both to an error-detecting coder 4 and to a multiplexer 6. The error-detecting coder 4 calculates the error-detecting code (in this embodiment, CRC parity bits (in short, CRC bits)) for one frame of the transmitted data. In this embodiment, the word length of the CRC bits is a fixed length.

Next, the multiplexer 6 arranges the error-detecting code (the CRC bits) calculated by the error-detecting coder 4 after the transmitted data. Here, the bit arrangements of the transmitted data and of the error-detecting code are set in a reverse order to each other. Concretely, in this embodiment, the error-detecting coder 4 outputs the error-detecting code bits in a reverse order to the normal case.

By the way, in this embodiment, to conduct the error-correcting coding with a convolutional code, the multiplexer 6 further adds tail bit(s) that will be necessary for the error-correcting decoding to the transmitted data and the error-detecting code, and outputs these sequentially, frame by frame.

FIGS. 4A and 4B show examples of the data sequence outputted from the multiplexer 6. Here, FIG. 4A shows the case where the transmission rate of the transmitted data is the maximum and FIG. 4B shows the case where the transmission rate of the transmitted data is below the maximum rate, respectively. When transmission is conducted at a transmission rate below the maximum rate, a blank time (time without data) emerges in the frame.

The data sequence outputted from the multiplexer 6 undergoes convolutional coding in an error-correcting coder 8 and sent to an interleaver 10 to be interleaved.

Figure 5:
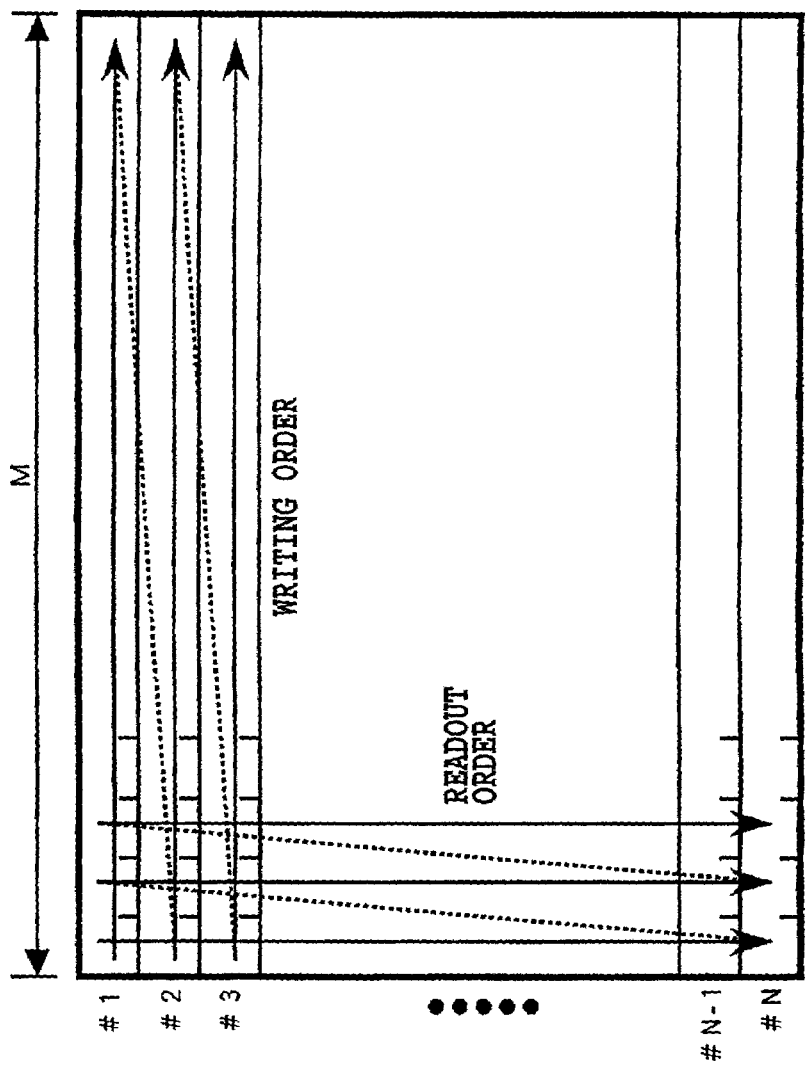
FIG. 5 is a diagram illustrating a processing example of an interleaver in the first embodiment according to the present invention.

FIG. 5 shows an example of the interleaving by the interleaver 10. The data sequence of one frame is outputted in a direction different from a direction in which the data is inputted, that is, the transmitted data inputted in a line direction is outputted in a column direction. Incidentally, as for another example of the interleaving, the interleaving processing described in Japanese Patent Application No. 11-129056 applied by the present applicant can be enumerated. The data sequence outputted from the interleaver 10 is written into s frame memory 12.

Figure 6:
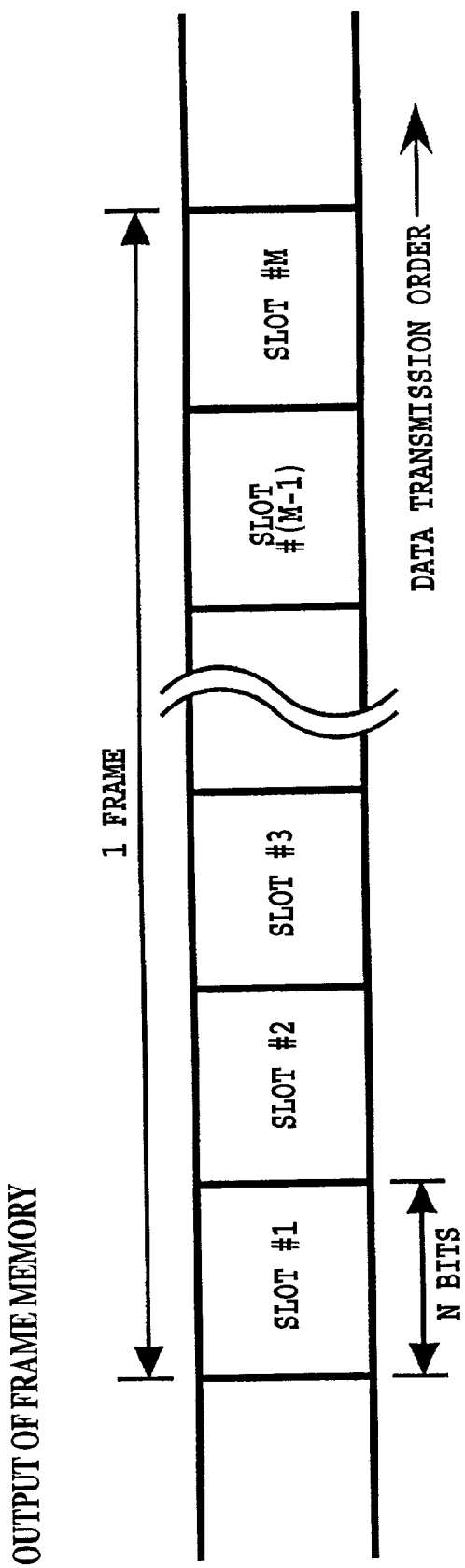
FIG. 6 is a diagram showing an example of a frame configuration of the transmitted data in the first embodiment according to the present invention.

FIG. 6 shows an example of the frame configuration of the data sequence obtained from the frame memory 12. The data interval corresponding to the column of the interleaver 10 is called a slot, and here it is assumed that one slot is composed of N bits and one frame is composed of M slots. The number of bits of one frame becomes N×M bits.

The output data sequence of the frame memory 12 is modulated by a radio circuit 14 and transmitted through an antenna 16. Here, for modulation schemes, for example, a spread spectrum modulation scheme, a QPSK modulation scheme, etc. are used. In addition, it is specified that no modulation is conducted at a data position corresponding to blank data in the slot. According to the foregoing, the data consisting of variable number of bits is made to be transmitted in a constant frame time.

Next, in the receiver, the received signals fed from an antenna 20 is demodulated by a radio circuit 22 and then inputted into a deinterleaver 24 sequentially. The deinterleaver 24 has a memory in it and conducts the interleaving in such a procedure that inputting into and outputting from the interleaver 10 at the transmitting side are reversed, that is, writing the data into the memory for each column (each slot) and reading the data for each line. Through such operations as these, an original data sequence of one frame is reproduced and the coded transmitted data sequence and the error-detecting code are revealed. The interleaving and the deinterleaving mentioned just above are intended to enhance an error correction effect even further by preventing burst errors as detected in consecutive data bits.

The deinterleaved data sequence is sent to an error-correcting decoder 26 and undergoes the error-correcting decoding by the maximum likelihood decoding method, and the decoded data sequence is separated into the error-detecting code and the data sequence by a demultiplexer 28, and the error-detecting code is inputted into a comparator 34.

On the other hand, the data sequence is outputted from a terminal 2 as received data and at the same time inputted into an error-detecting coder 30. At the error-detecting coder 30, the inputted data sequence undergoes the same error-detecting coding as that of the transmitter again. The error-detecting code obtained by re-coding is compared with the error-detecting code so separated, code-bit by code-bit, by the comparator 34, and if all the code bits are found to agree with each other, a coincidence signal is outputted. In addition, since the error-correcting code bits in the received frame are in a reverse order to the normal case, the error-detecting coder 30 in this embodiment outputs the error-correcting code bits in a reverse order to the normal case.

Here, the error-correcting decoding and the calculation of the error-detecting code are conducted, frame by frame, by successively assuming the final bit position of transmittable frame data. At this occasion, the error-correcting decoder 26 sends likelihood information for a decoding result up to each of the assumed final bit positions to a rate decision circuit 36, and the rate decision circuit 36 decides the final bit position, namely, the transmission rate of the frame on the basis of this likelihood information and the coincidence signal of the error-detecting codes.

Figure 7:
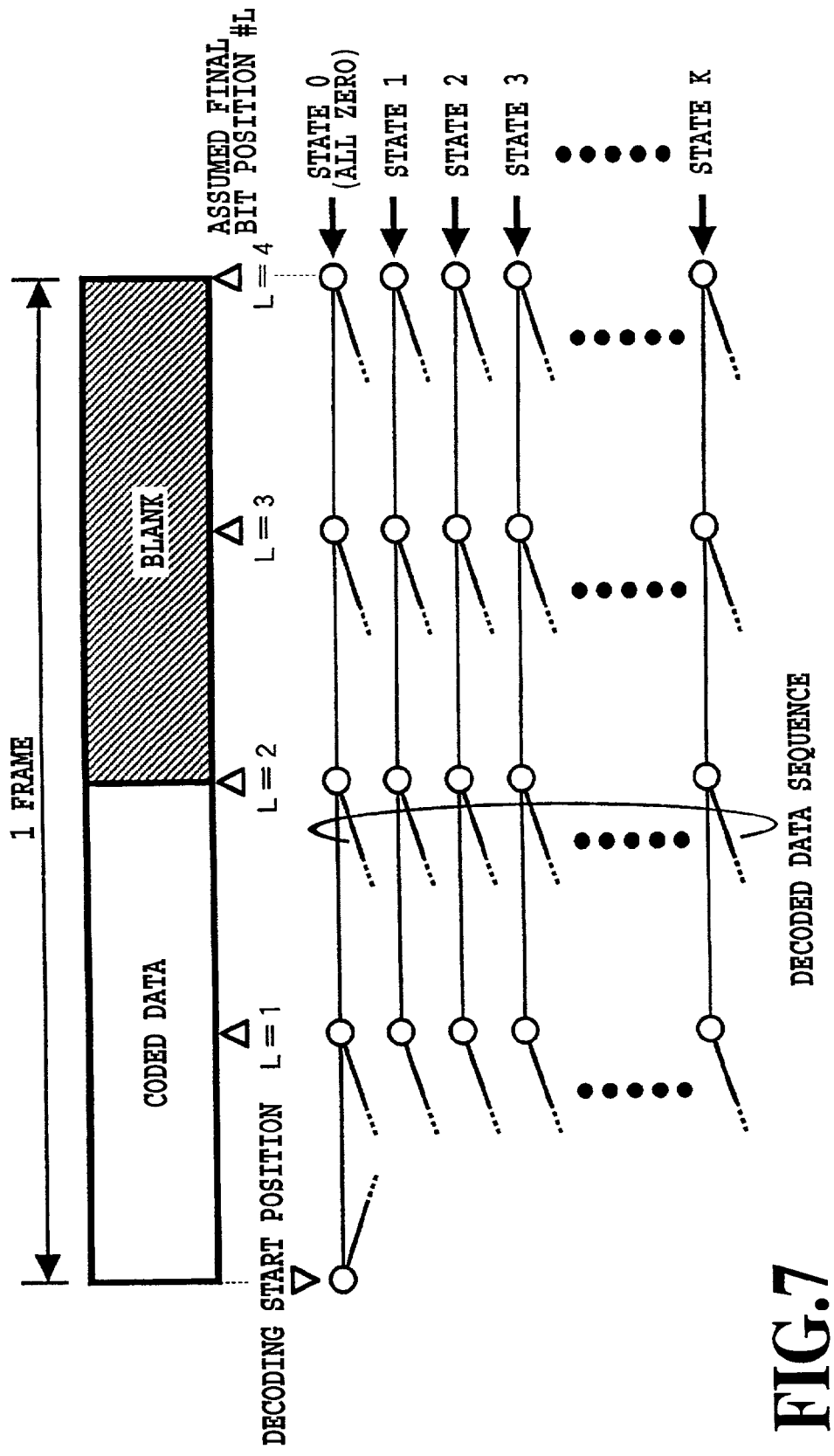
FIG. 7 is a diagram showing an example of a decoded data sequence at the time of the maximum likelihood decoding in the first embodiment according to the present invention.
Figure 8:
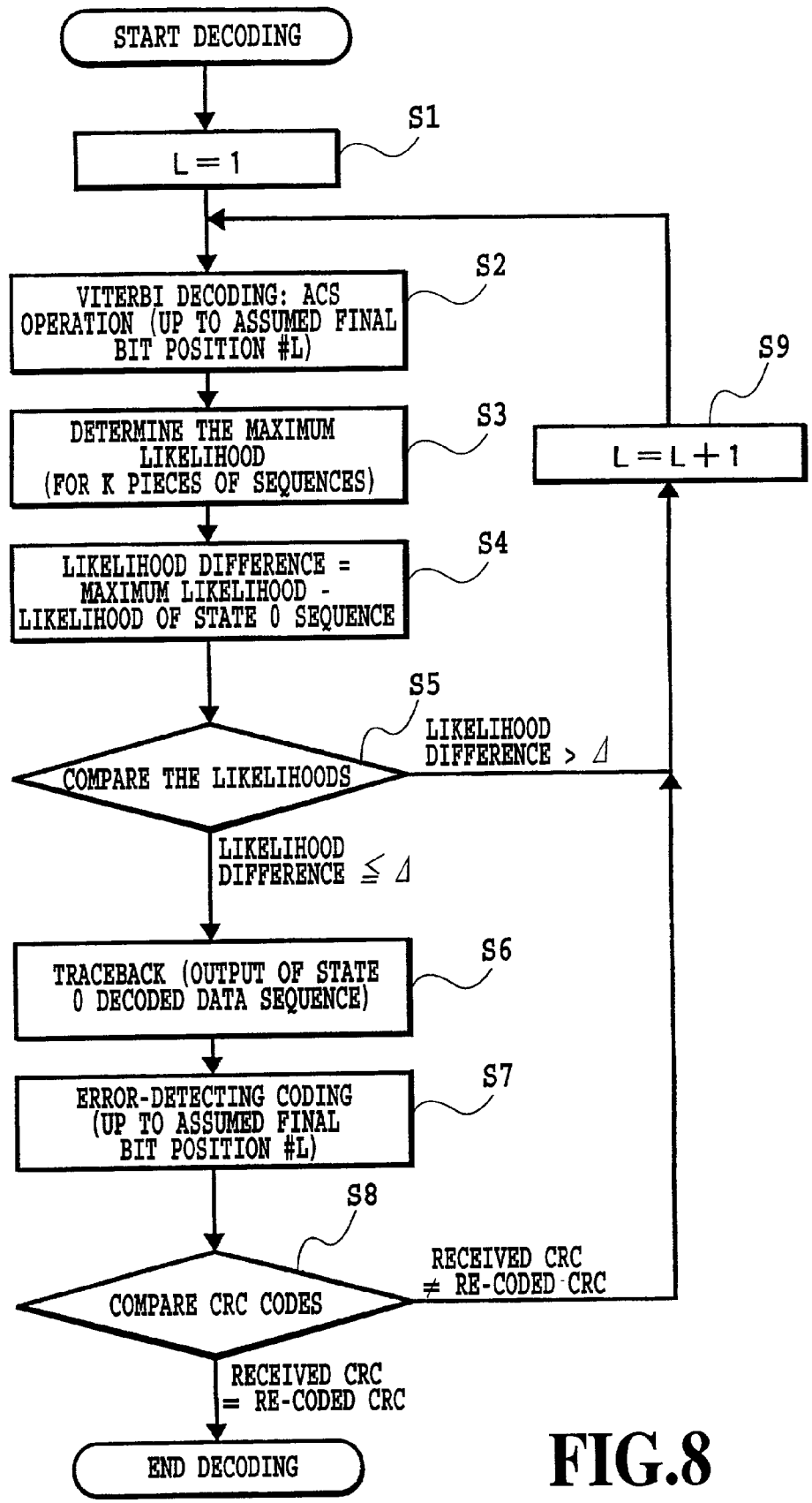
FIG. 8 is a flowchart of a processing example of rate decision in the first embodiment according to the present invention.

FIG. 7 shows an example of the decoded data sequence at the time of the maximum likelihood decoding, and FIG. 8 shows an example of the processing of rate decision (algorithm). Here, for the maximum likelihood decoding, Viterbi decoding is assumed.

First, after Viterbi decoding starts, regarding a plurality of decoded data sequences each of which still remains in each state (in the example of FIG. 7, K pieces of the decoded data sequences that reach the states 1 to K) at the assumed final bit position (in the example of FIGS. 7 and 8, the position #L), the likelihoods with respect to the transmitted data sequence of those are obtained, respectively, and a difference between the maximum value of these likelihood and a likelihood with respect to the transmitted data sequence of the decoded data sequence (in the example of FIG. 7, the data sequence that reaches the state 0) obtained by terminating the decoding process is obtained (steps S1 to S4).

If this likelihood difference is within a certain range (in the example of FIG. 8, within $\Delta$), the selected decoded data sequence is outputted by traceback and the error-detecting coding (CRC coding) is conducted (steps S5 and S6).

Since in this embodiment the word length of the CRC code is a fixed length and a frame configuration that the transmitted data is arranged just ahead of the CRC code is adopted, (assumed) transmitted data (part) and the (assumed) error-detecting code (part) for the assumed final bit position can be obtained. That is, by assuming the final bit position, the transmitted data (part) and the error-detecting code (part) are concomitantly assumed. Then, the obtained (assumed) transmitted data undergoes the error-detecting (re-)coding (CRC coding).

If this re-coded CRC agrees with the received CRC ((assumed) error-detecting code), the decoding is ended and the transmitted data is acquired (restored) by deciding that the assumed final bit position is the final bit position of the transmitted frame data. Since the bit arrangements of the transmitted data in the frame and of the error-detecting code are in a reverse order to each other, the probability that a comparison result of CRCs indicates coincidence erroneously is extremely small.

If the likelihood difference exceeds $\Delta$ or the comparison result of CRCs indicates no coincidence, a next position is assumed and Viterbi decoding is continued. In addition, if there are detected a plurality of positions where the likelihood difference is within $\Delta$ and the comparison result of the error-detecting codes indicates coincidence when Viterbi decoding and the calculation of the error-detecting code are conducted for the assumed final bit positions, a decision that a position where the likelihood difference becomes the minimum is the final bit position of the transmitted frame data may be made. This will be described later.

In the example of FIG. 7, if no error occurs on the way of transmission, it is reasonable to think as follows: a sequence that reaches the state 0 at the second position (L=2) has the maximum likelihood (likelihood difference =0) and the comparison result of the error-detecting codes for this decoded sequence indicates coincidence.

On the other hand, if an error or errors occurs on the may of transmission, a sequence that reaches the state 0 does not necessarily have the maximum likelihood. Accordingly, by setting $\Delta$ to an appropriate value, the same effect of reduction in the rate-decision error rate as that in the case of no transmission error can be obtained also for the decoded sequence such that occurred errors have been corrected. In a region where the value of $\Delta$ is not more than a certain value, by setting $\Delta$ to a smaller value, an average rate-decision error rate can be lowered further; an average frame error rate (the probability that the comparison result of CRCs indicates no coincidence+the rate-decision error rate) becomes larger.

Therefore, for example, for data that requires an extremely low rate-decision error rate, such as control data, it is better to make $\Delta$ smaller at the cost of the frame error rate to some degree.

Alternatively, considering tendency of the errors that occur during the transmission with respect to $\Delta$, the difference between the maximum and the minimum of the likelihoods obtained at respective assumed final bit positions is regarded as a factor and a constant value multiplied by this factor may be set as $\Delta$.

When data transmission is conducted using the transmitter and the receiver of such configurations as in the foregoing, even if the receiving side varies the number of bits in the frame (namely, apparent transmission rate) without sending any information indicating the number of transmission bits in the frame from the receiving side, the receiving side can receive the data.

In addition, this scheme makes it possible both, at the receiving side, to lower the probability of detecting the rate mistakenly during transmitting the variable rate data, and at the transmitting side, to eliminate the need for providing buffer for temporarily storing the transmitted data.

Furthermore, by adopting the rate decision method that uses jointly the likelihood information during Viterbi decoding, it is possible to lower the possibility of outputting the transmitted data of an erroneous length in the frame on the basis of the erroneous decision result of the rate, and thus a highly-reliabile variable rate data transmission can be conducted.

As described above, if there are detected a plurality of positions where the likelihood difference is within $\Delta$ and the comparison result of the error-detecting codes indicates coincidence when Viterbi decoding and the calculation of the error-detecting code are conducted for the assumed final bit positions, a decision that a position where the likelihood difference becomes the minimum is the final bit position of the transmitted frame data may be made.

Figure 9A:
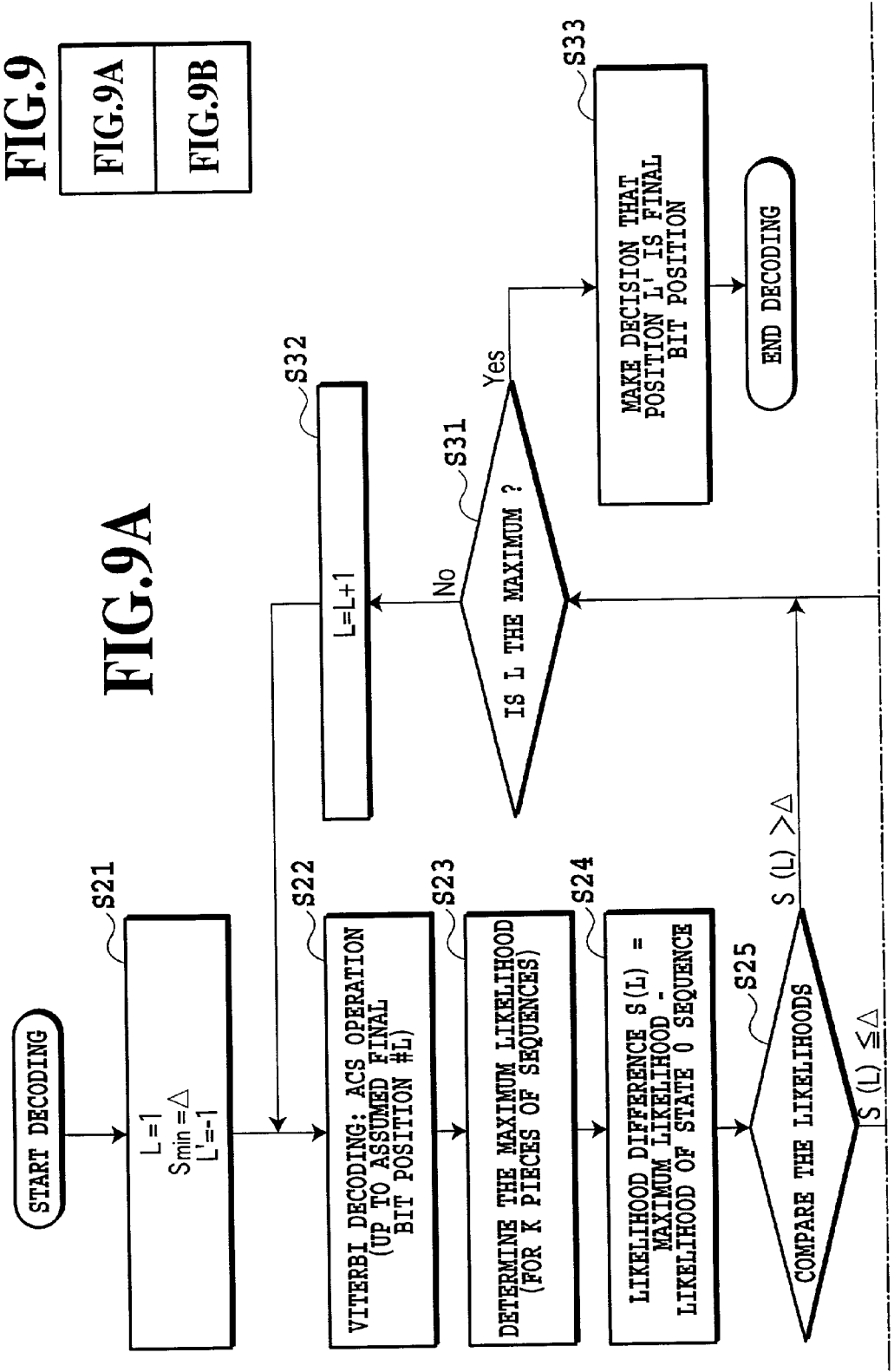
FIGS. 9A and 9B are flowcharts of another processing example of rate decision in the first embodiment according to the present invention.
Figure 9B:
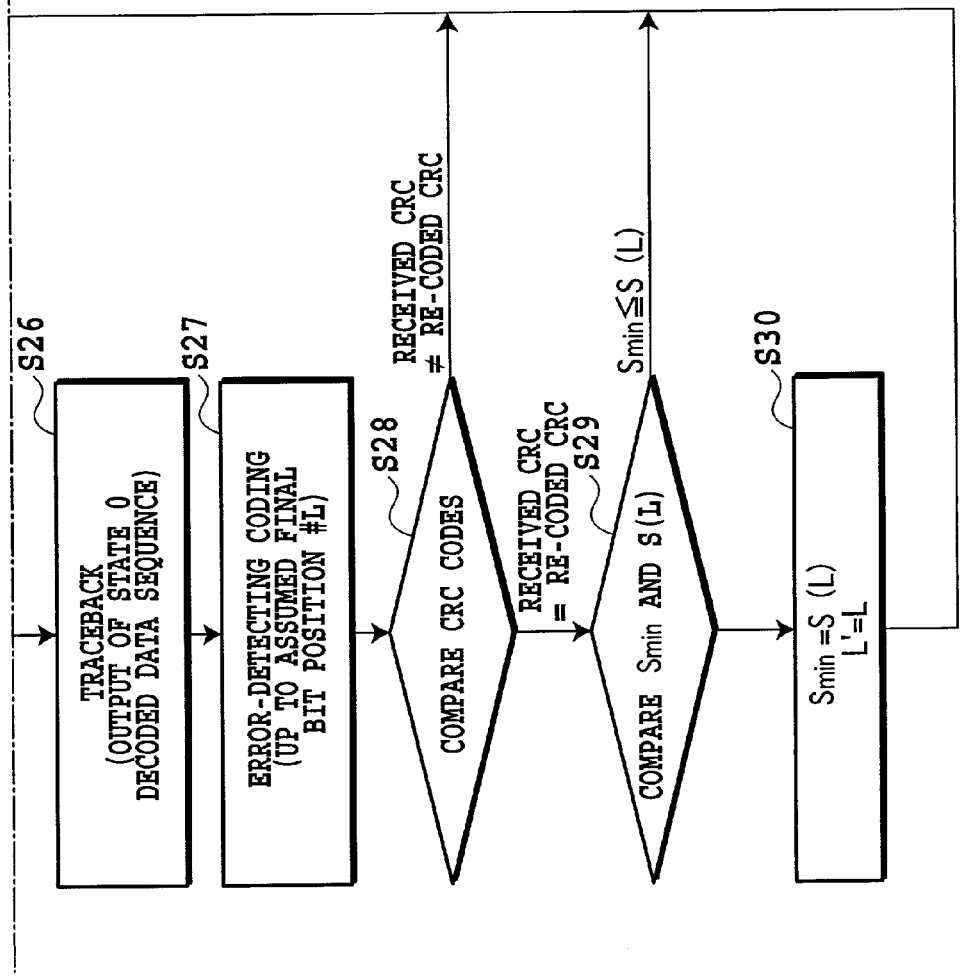

FIGS. 9A and 9B show another example of the processing of rate decision (algorithm). In the example of FIGS. 9A and 9B, —representing the assumed bit position as L—an assumed first position (L=1, or alternatively as described in a third embodiment, L=0 is allowable) through an assumed final position (at step S31, whether or not the assumed final position has been checked is judged) are thoroughly checked and then a decision that a position where the likelihood difference is the minimum is the final bit position is made. In this occasion, a variable $S_{min}$ for storing the minimum likelihood difference and a variable L' for storing its position are used.

However, it is conceivable that there is a case where the likelihood difference is within $\Delta$ and not a single position where the comparison result of the error-detecting codes indicates coincidence is detected. Since in that case, even at the stage of step S33, L' satisfies L'=−1 (a value that was set at step S21), it may be allowed that the case is assumed as, for example, an error. In addition, if the value of $\Delta$ is set to infinity, a situation that not a single position where the likelihood difference is within $\Delta$ is detected can be avoided.

In this embodiment, the error-correcting coding is conducted with a convolutional code, but the error-correcting coding may be done by means of other method, for example, one with a turbo code. Furthermore, as the above-mentioned WO97/50219, the frame data may be divided into a plurality of blocks and each block may undergo the error-correcting coding with a block code.

Moreover, in this embodiment, the frame data undergoes the error-correcting coding and the interleaving as well as the deinterleaving and the error-correcting decoding. However, without these operations, it is possible that the probability of detecting the rate mistakenly in the variable rate data transmission is suppressed to low and that the need for providing buffer for temporarily storing the transmitted data is eliminated. In that case, all that is needed is that among the assumed final bit positions of the assumed frame data, a position where the assumed error-detecting code agrees with an error-detecting code calculated on the basis of the assumed transmitted data is simply decided to be the final bit position of the frame data, without using the likelihood information.

SECOND EMBODIMENT

Figure 10A:
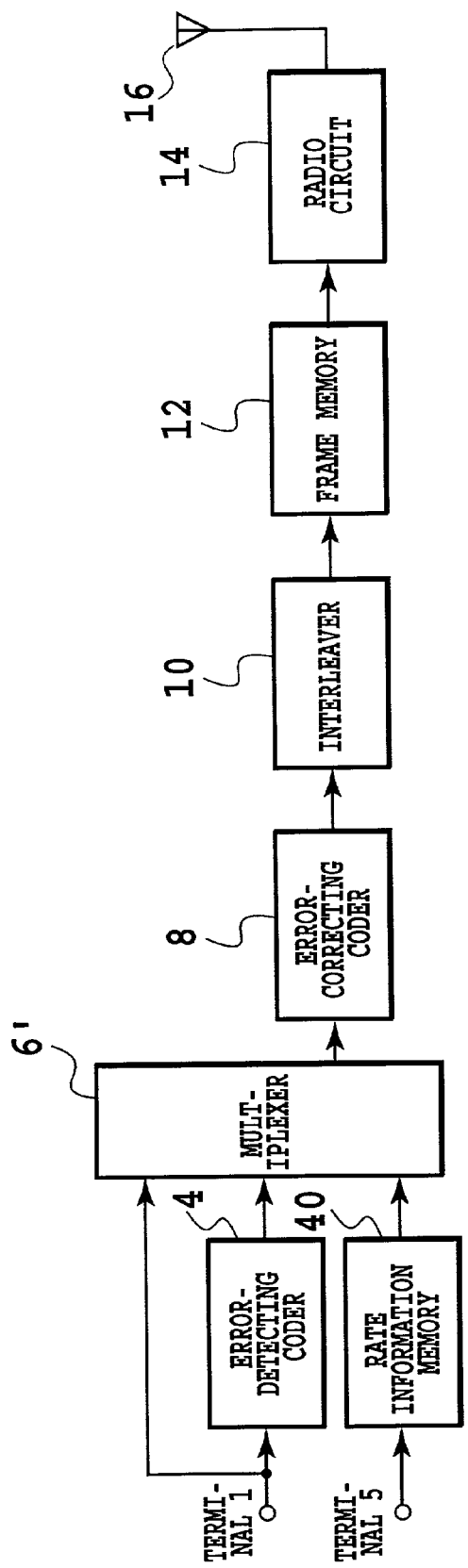
FIGS. 10A and 10B are block diagrams showing examples of the configurations of the transmitter and the receiver in a second embodiment according to the present invention.
Figure 10B:
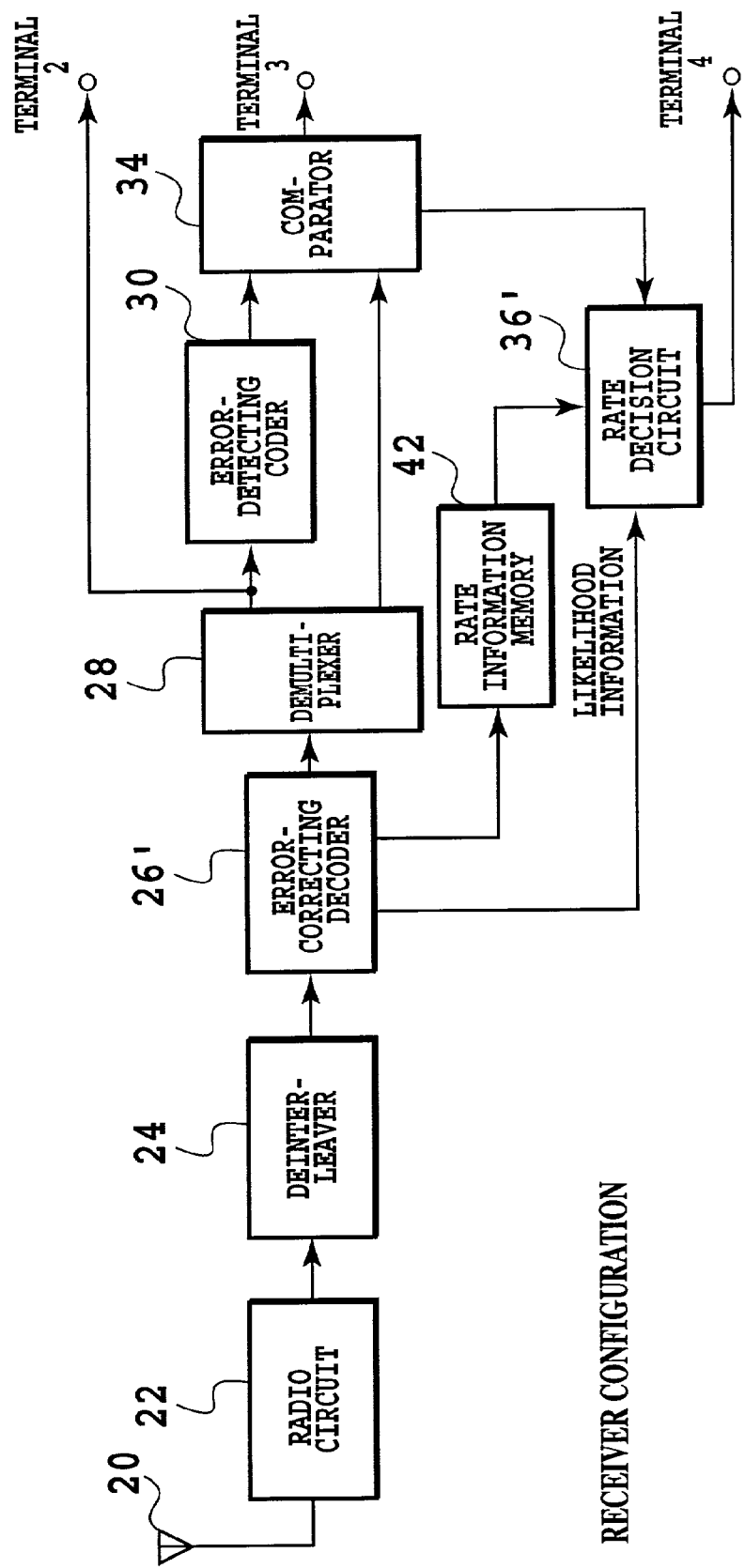

FIGS. 10A and 10B show examples of the block constructs of a transmitter and a receiver in a second embodiment according to the present invention.

In the configuration of FIGS. 10A and 10B, transmission of information indicating the rate of the transmitted data is added to the configuration of FIGS. 3A and 3B, and the receiving side uses this rate information additionally to make the rate decision. In FIGS. 10A and 10B, all the parts common to those of the configurations of FIGS. 3A and 3B are denoted by the same numerals. Description of operations will be given below, focusing on parts different from those of FIGS. 3A and 3B.

First, information indicating the rate of the transmitted data (transmission rate information) that is applied to the terminal 5 is sent to a rate information memory 40. Here, the contents of the rate information memory 40 are information indicating the rate information of the transmitted data, namely, the number of bits. A multiplexer 6' outputs the following information successively, frame by frame: information indicating the rate of the transmitted data being read from the rate information memory 40; the transmitted data sent from the terminal 1; the error-detecting code calculated by the error-detecting coder 4; and the tail bits. Also here, the error-detecting code is arranged after the transmitted data and at the same time the bit arrangements of the transmitted data and of the error-detecting code are set in a reverse order to each other. In addition, in this embodiment, the transmission rate information is arranged at the first position of the frame.

FIGS. 11A and 11B show examples of the data sequences outputted from the multiplexer 6'.

In this embodiment, the error-correcting coder 8 conducts the error-correcting coding with a block code for the transmission rate information (as examples of concrete error-correcting codes, one may enumerate a double orthogonal code, Reed-Muller code, BCH code, etc. or alternatively error-correcting coding other than the error-correcting coding with a block code may be used), and does the error-correcting coding with a convolutional code for the transmitted data, the error-detecting code, and the tail bits. Furthermore, the interleaver 10 conducts the interleaving of these data that have undergone the error-correcting coding, either independently for each data or collectively. In addition, in the error-correcting coder 8, all of the transmission rate information, the transmitted data, the error-detecting code, and the tail bits may undergo collectively the error-correcting coding with a convolutional code.

On the other hand, in the receiver, if the transmission rate information undergoes the error-correcting coding with a block code or the like independently from the transmitted data or the like, the transmission rate information part undergoes the error-correcting decoding properly in an error-correcting decoder 26' and subsequently the decoding result is retained in a rate information memory 42. On the contrary, if the transmission rate information, the transmitted data, etc. undergo convolutional-coding collectively, in the error-correcting decoder 26' the decoding result of the rate information bits part arranged at the first position of the frame is temporarily obtained by interrupting sequential Viterbi decoding that has been started from the first position of the frame, and this decoding result is retained in the rate information memory 42.

Figure 12:
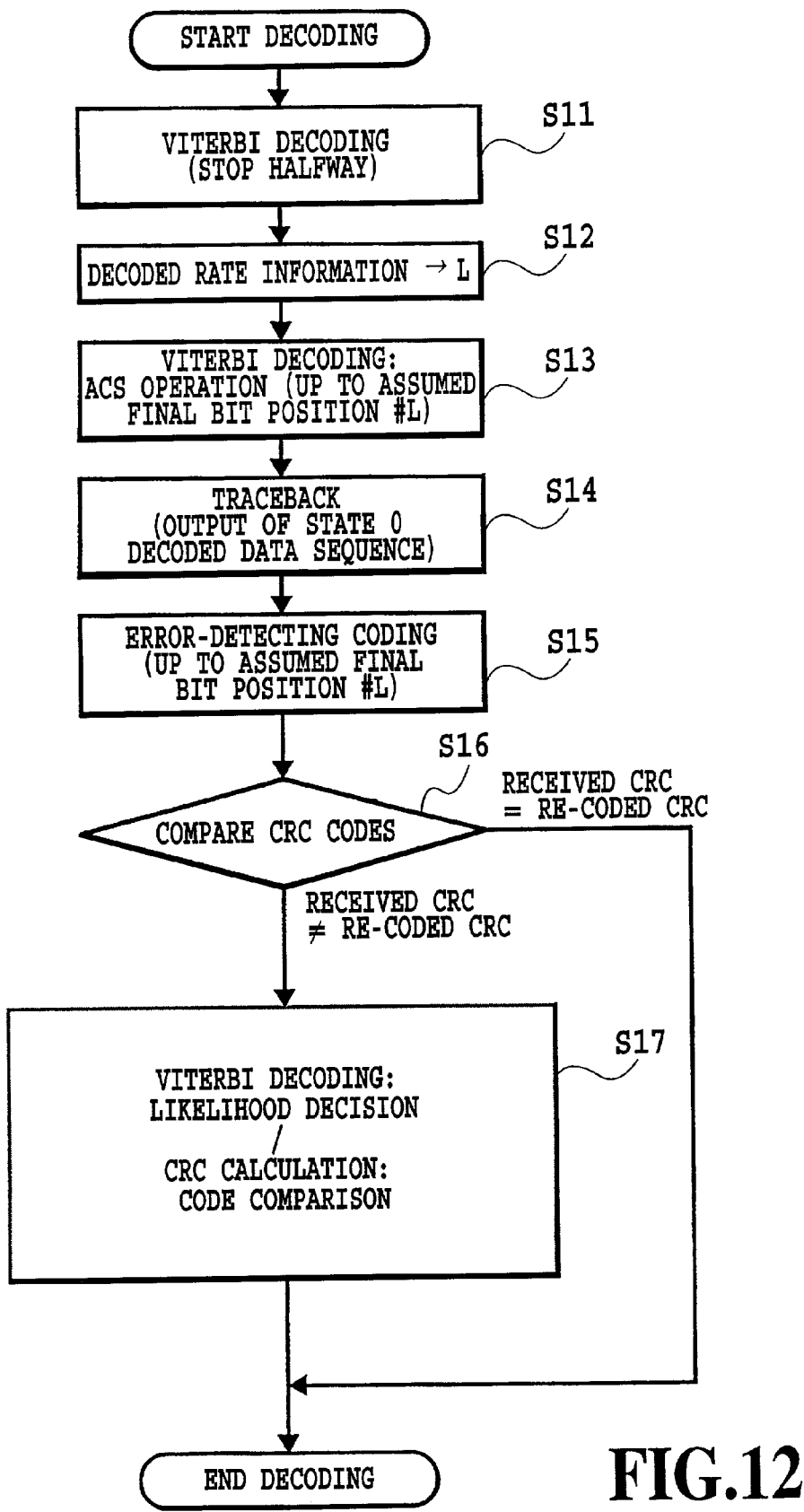
FIG. 12 is a flowchart of a processing example of rate decision in the second embodiment according to the present invention.

FIG. 12 shows the rate decision processing (algorithm) in the receiver of this embodiment. The error-correcting decoder 26' assumes a position indicated by the contents of the rate information memory 42 as the final bit position, continues to conduct Viterbi decoding of the frame data up to that position, outputs the decoded data sequence obtained by terminating the decoding process through traceback, and conducts the error-detecting coding (CRC coding) (steps S11 to S15).

If the re-coded CRC agrees with the received CRC the decoding process is completed (step S16), a decision that the position indicated by the contents of the rate information memory is the final bit position of the transmitted frame data is made and the transmitted data is acquired (restored). Since the bit arrangements of the transmitted data in the frame and of the error-detecting code are set in a reverse order to each other, the probability that the comparison result of CRCs indicates coincidence erroneously is extremely small.

In this embodiment, if the comparison result of CRCs indicates no coincidence, the final position of the transmittable frame data other than the final bit position indicated by the contents of the rate information memory is assumed successively, the error-correcting decoding and the calculation of the error-detecting code are conducted, and the rate decision is made using the likelihood information during Viterbi decoding and the comparison result of the error-detecting codes (the same processing as step S17 and steps S1 to S8 of FIG. 8).

Also, between steps S13 and S14, similarly to the first embodiment, the following steps may be added: determining the maximum likelihood (step S3); finding the likelihood difference (step S4); and judging whether or not the likelihood difference is within a certain range (step S5). Concrete processes may be as follows: if the likelihood difference is within a certain range, the flow is made to proceed to step S14; if the likelihood difference is not within a certain range, the flow is made to proceed to step S17. In the case where such processing (steps S3 to S5) is conducted, although the number of processes increase as compared to when such processing is not done, the rate-decision error rate can be improved further. In addition, Δ used at step S5 between step S13 and step S14 and Δ used at step S5 while being in step S17 may be the same value or may be different values.

Also in the case where the transmitter and the receiver of the foregoing configurations are used to conduct the data transmission, it is possible that the probability of detecting the rate mistakenly at the receiving side during transmitting variable rate data is suppressed to low and that the need for providing buffer for temporarily storing the transmitted data at the transmitting side is eliminated.

Moreover, if there is no transmission error, the rate information is surely detected by the receiver; on the other hand, supposing that the rate information is transmitted erroneously, the rate decision is made possible through the use of likelihood information during Viterbi decoding and the comparison result of the error-detecting codes, so that the final frame error rate is improved and a low rate-decision error rate is achieved. By this means, the highly-reliabile variable rate data transmission can be performed.

In addition, since the reliability of Viterbi decoding result of the rate information bit part can be made larger as the input signal stored in the decoder, namely, the length of the subsequent coded data sequence becomes longer in the foregoing description, it is preferable that the data sequences of a fixed length other than the transmitted data, such as the error-detecting code, are arranged just after the rate information bits successively as much as possible.

Alternatively, it may be also possible that in the transmitter the tail bits are inserted after the rate information bits, and in the receiver the decoding operation is temporarily completed at this tail bits, and after the received rate information is obtained, the decoding operation is re-started to decode the frame data up to the final bit.

THIRD EMBODIMENT

Figure 13:
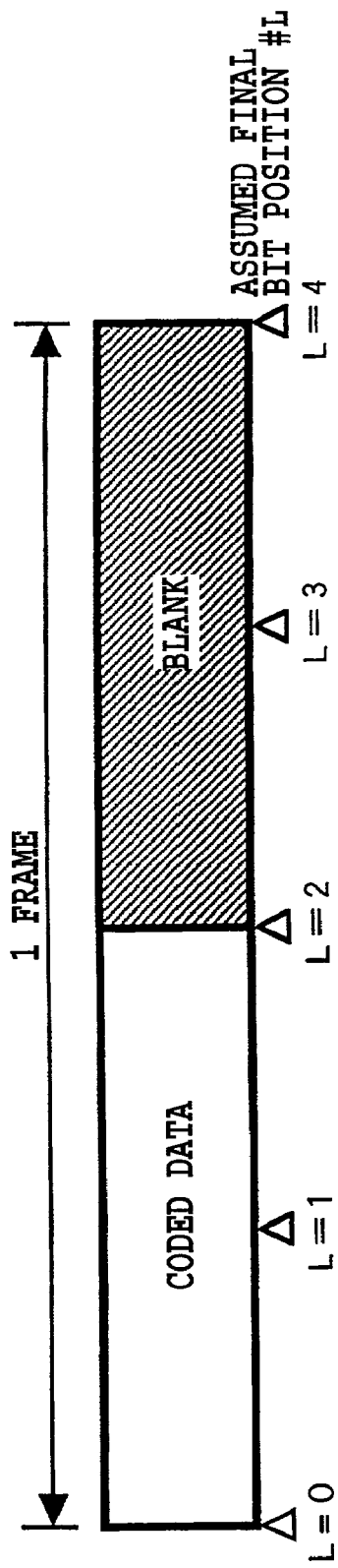
FIG. 13 is a diagram showing the frame and the final bit positions therein.

In the first embodiment and the second embodiment, it is possible that, considering a case where the number of bits of the transmitted data becomes zero, if the number of bits of the transmitted data is zero at the transmitting side, the frame data is generated by considering the previously-specified bit pattern to be the error-detecting code. It is possible that at the receiving side, a position where the number of bits of the transmitted data becomes zero is also assumed as the final bit position of the frame data (that is, in FIG. 13, a position where L=0 is also assumed as the final bit position of the frame data), and if the error-detecting code in the case of the the assumption agrees with the above-mentioned previously-specified bit pattern, a decision that the position where the number of bits of the transmitted data becomes zero is the final bit position of the frame data is made.

In actual data transmissions, there is a case where the number of bits of the transmitted data to be sent becomes zero, for example, as a silent interval (namely, an interval when a sender does not speak) in the case of transmission of voice information, and it is preferable that the receiving side conducts the rate detection correctly for various cases including a case like this (that is, a case where apparent transmission rate=0) (this is because at the receiving side a decoder of voice codec (CODEC) may recognize such an interval as a silent interval and conduct processing different from that of non-silent intervals, such as generation of a background noise).

For the previously-specified bit pattern, for example, bits equivalent to the parity bits of the error-detecting code (because of absence of the data, bits corresponding to an initial state of the error-detecting coder; for example, bits all consisting of zeros) may be used. If the number of bits of the transmitted data is zero, the transmitting side transmits the bits equivalent to the parity bits of the error-detecting code (because of absence of the data, only these bits equivalent to the parity bits are error-correcting coded and transmitted). At the receiving side, the rate detection is conducted for candidate final bit positions including the final bit position when the number of data bits is equal to zero (the error detection at this occasion does not necessitate calculating the error-detecting code for the received data—re-encoding—, and all that is needed is only to compare the received parity-bit equivalent bits with the previously-specified bit pattern). Incidentally, if the bits equivalent to the parity bits of the error-detecting code is used as the previously-specified bit pattern, the need for additionally providing a circuit for generating the previously-specified bit pattern can be eliminated.

Although the circuit can be used in common by equalizing the length of the bit pattern with that of the parity bits of the error-detecting code (or CRC) that is given when the number of the other data bits is not zero, the length may be different as the need arises.

For the bit pattern, it is necessary to specify previously at least one kind of a pattern, but it may be possible that a plurality of patterns are specified and one of these is used in combination with other purpose (each of various control information is transmitted being mapped with each bit pattern).

FOURTH EMBODIMENT

In the first embodiment through the third embodiment, it is possible that in judging (at the receiving side) whether or not the likelihood difference is within the predetermined range (step S5 in FIG. 8), the predetermined range (the value of Δ in FIG. 8) is varied (is made different) according to the assumed final bit position of the frame data.

When the present invention is applied in actual radio communicaiton environments, a proper value of Δ to obtain the desired detection performance may differ for each of the final bit positions (that is, different number of bits of the transmitted data in the frame) depending on the tendency of the transmission bit errors in the transmission path. In such cases, if a single value of Δ is used in common, the rate detection performance differs according to the final bit position. Consequently, there arises a problem in that when a percentage of transmission frequencies of the transmission rates (final bit positions) vary, the average quality of the variable rate data transmission including the rate detection performance changes.

Then, it is conceivable that the value of Δ for the decision of the threshold value is set to not a single value but several different values (Δ1, Δ2, . . . , ΔL . . . , ΔN) for respective final bit positions (respective transmission rates) and thereby the decision of the rate is made possible. Here, a value of each ΔL may be varied during the transmission so as to be always an optimum value in response to the change in the transmission environment. Furthermore, the same value may be used in part repeatedly.

OTHERS

The techniques described in the third and fourth embodiments may be applied both to the case of "postposition and same order" (that is, a case where the error-detecting code is arranged after the transmitted data and the bit arrangements of the transmitted data and of the error-detecting code are set in the same order) and to the case of "preposition" (that is, a case where the error-detecting code is arranged ahead of the transmitted data and the bit arrangements may be in the same order or in a reverse order).

Figure 16A:
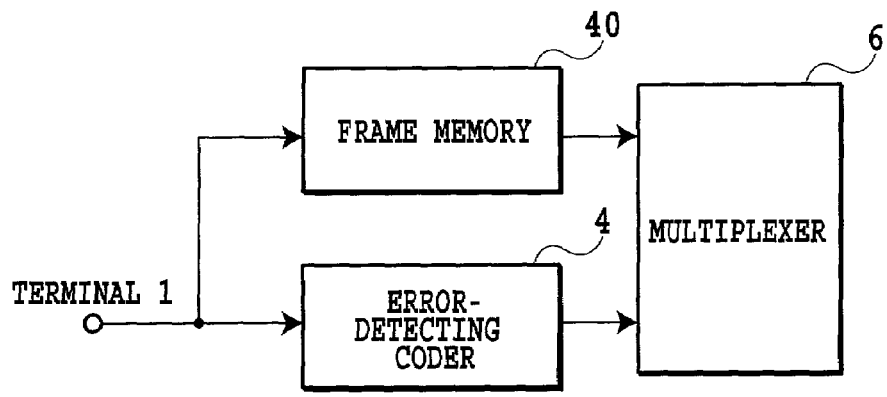
FIGS. 16A and 16B are diagrams showing examples where frame memory and error-detecting code memory are added to the configuration of the "preposition" case.
Figure 16B:
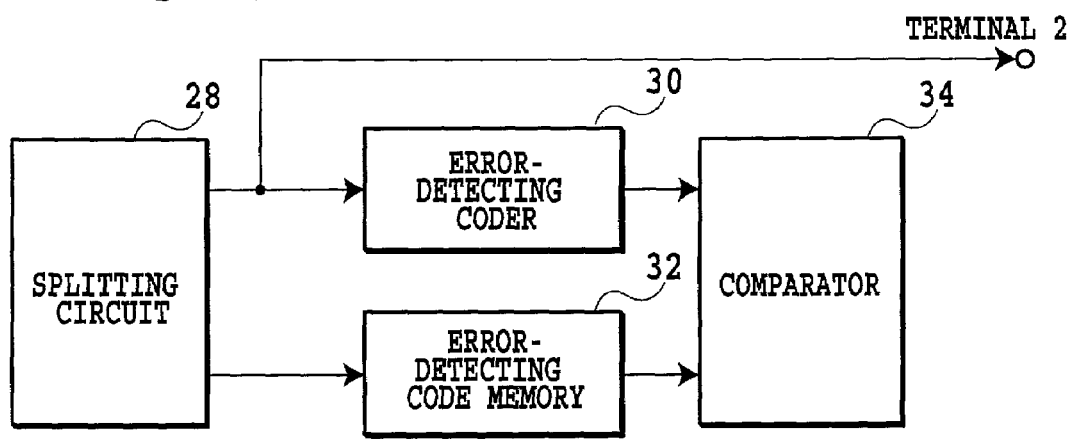

FIGS. 14A and 14B show examples of the frame configurations of the transmitted data in the case of "postposition and same order," and FIGS. 15A and 15B show examples of the frame configurations of the transmitted data in the case of "preposition." Configuration examples of the transmitter and the receiver used in the case of "postposition and same order" and in the case of "preposition," a processing example, and the like are the same as those of FIGS. 3A and 3B through FIG. 12. In addition, in the case of "preposition," as shown in FIGS. 16A and 16B, it is conceivable that, for example a frame memory 40 is provided between the terminal 1 and the multiplexer 6 and thereby the transmitted data is temporarily stored, and in the mean time the error-detecting code is calculated by the error-detecting coder 4. Moreover, it is conceivable that, for example, an error-detecting code memory 42 is provided between the demultiplexer 28 and the comparator 34 and thereby the assumed error-detecting code is temporarily stored, and in the meantime the error-detecting code of the assumed transmitted data is calculated by the error-detecting coder 30.

As explained in the foregoing, according to the present invention, in the variable rate data transmission, the probability of detecting the rate mistakenly at the receiving side can be suppressed to low and the need for providing buffer for temporarily storing the transmitted data at the transmitting side can be eliminated.

Moreover, in the broad area of communication environments and variable rate conditions, highly-efficient variable rate data transmission of high-quality is made possible.

What is claimed is:

1. A data transmission method that puts variable length transmitted data into frames of a fixed time length and transmits these frames, comprising the steps of:
   at a transmitting side,
      calculating an error-detecting code of the transmitted data, frame by frame;
      generating frame data containing the transmitted data and the calculated error-detecting code such that the error-detecting code is arranged after the corresponding transmitted data; and
      transmitting the generated frame data, and
   at a receiving side,
      receiving the frame data;
      assuming the transmitted data and the error-detecting code by assuming a final bit position of the frame data, frame by frame, for the received frame data and calculating the error-detecting code of the assumed transmitted data;
      deciding that among the assumed final bit positions of the frame data, a position where the assumed error-detecting code agrees with the error-detecting code calculated on the basis of the assumed transmitted data is the final bit position of the frame data; and
      acquiring the transmitted data on the basis of a decision result,
   wherein
   at the transmitting side,
      if the number of bits of the transmitted data is zero, said step of calculating the error-detecting code considers a previously-specified bit pattern to be the error-detecting code, and
   at the receiving side,
      said step of calculating the error-detecting code also assumes a position where the number of bits of the transmitted data becomes zero as the final bit position of the frame data, and
      if the error-detecting code when the position where the number of bits of the transmitted data becomes zero is assumed as the final bit position of the frame data agrees with said previously-specified bit pattern, said step of deciding decides that the position where the number of bits of the transmitted data becomes zero is the final bit position of the frame data.

2. The data transmission method as claimed in claim 1, wherein at the transmitting side, said step of generating the frame data generates the frame data containing the transmitted data and the calculated error-detecting code such that the error-detecting code is arranged after the corresponding transmitted data and bit arrangements of the transmitted data and of the error-detecting code are set in a reverse order to each other.

3. The data transmission method as claimed in claim 1, wherein at the transmitting side, said step of generating the frame data generates the frame data containing the transmitted data and the calculated error-detecting code such that the error-detecting code is arranged after the corresponding transmitted data and bit arrangements of the transmitted data and of the error-detecting code are set in the same order.

4. The data transmission method as claimed in any one of claims 1, 2 and 3, further comprising the steps of:
   at the transmitting side,
      conducting error-correcting coding of the generated frame data; and
      conducting interleaving of the frame data that has undergone the error-correcting coding, and
   at the receiving side,
      conducting deinterleaving of the received frame data; and
      conducting error-correcting decoding of the frame data that has undergone the deinterleaving.

5. The data transmission method as claimed in claim 4, wherein
   at the transmitting side,
      said step of generating the frame data generates the frame data containing a tail bit; and
      said step of conducting the error-correcting coding conducts the error-correcting coding with a convolutional code, and
   at the receiving side,
      said step of conducting the error-correcting decoding assumes the final bit position of the frame data, frame by frame, for the frame data that has undergone the deinterleaving, conducts the error-correcting decoding thereof by a maximum likelihood decoding method up to said assumed final bit position, and at said assumed final bit position, calculates a likelihood difference between the maximum of likelihoods of a plurality of decoded data sequences that are candidates with respect to the transmitted data sequence and a likelihood of the decoded data sequence obtained by terminating the decoding with respect to the transmitted data sequence, and
      said step of deciding decides that among the assumed final bit positions of the frame data, a position where the obtained likelihood difference is within a predetermined range and the assumed error-detecting code agrees with the error-detecting code calculated on the basis of the assumed transmitted data is the final bit position of the frame data.

6. The data transmission method as claimed in claim 5, wherein at the receiving side, the predetermined range regarding the likelihood difference at said step of deciding depends on the assumed final bit position of the frame data.

7. The data transmission method as claimed in claim 5, further comprising the step of:
   at the transmitting side,
      calculating transmission rate information indicating the number of bits of the transmitted data, frame by frame,
      wherein said step of generating the frame data generates the frame data containing the calculated transmission rate information, and
   at the receiving side,
      wherein both said step of conducting the error-correcting decoding and said step of calculating the error-detecting code assume the final bit position of the frame data on the basis of the transmission rate information in the received frame data.

8. The data transmission method as claimed in claim 7, wherein at the transmitting side, said step of conducting the error-correcting coding conducts, for the transmission rate information, independent error-correcting coding that is separate from the error-correcting coding for the transmitted data, the error-detecting code, and the tail bit.

9. The data transmission method as claimed in claim 8, wherein at the transmitting side, said step of conducting the error-correcting coding conducts the error-correcting coding of the transmission rate information by using a block code.

10. The data transmission method as claimed in claim 7, wherein at the transmitting side, said step of conducting the error-correcting coding conducts the error-correcting coding of all of the transmission rate information, the transmitted data, the error-detecting code, and the tail bit collectively with a convolutional code.

11. The data transmission method as claimed in claims 7, wherein at the receiving side, if said step of deciding does not decide that the final bit position of the frame data assumed on the basis of the transmission rate information in the received frame data is the final bit position of the frame data, both said step of conducting the error-correcting decoding and said step of calculating the error-detecting code assume a position other than the final bit position of the frame data assumed on the basis of the transmission rate information in the received frame data as the final bit position of the frame data.

12. The data transmission method as claimed in any one of claims 1, 2 and 3, wherein said error-detecting code is a CRC code.

13. A data transmission system that puts variable length transmitted data into frames of a fixed time length and transmits these frames, comprising:
   in a transmitter,
      means for calculating an error-detecting code of the transmitted data, frame by frame;
      means for generating frame data containing the transmitted data and the calculated error-detecting code such that the error-detecting code is arranged after the corresponding transmitted data; and
      means for transmitting the generated frame data, and
   in a receiver,
      means for receiving the frame data;
      means for assuming the transmitted data and the error-detecting code by assuming a final bit position of the frame data, frame by frame, for the received frame data, and calculating the error-detecting code of the assumed transmitted data;
      means for deciding that among the assumed final bit positions of the frame data, a position where the assumed error-detecting code agrees with the error-detecting code calculated on the basis of the assumed transmitted data is the final bit position of the frame data; and
      means for acquiring the transmitted data on the basis of a decision result,
   wherein
   in the transmitter,
      if the number of bits of the transmitted data is zero, said means for calculating the error-detecting code considers a previously-specified bit pattern to be the error-detecting code, and
   in the receiver,
      said means for calculating the error-detecting code also assumes a position where the number of bits of the transmitted data becomes zero as the final bit position of the frame data, and
      if the error-detecting code when the position where the number of bits of the transmitted data becomes zero is assumed as the final bit position of the frame data agrees with said previously-specified bit pattern, said means for deciding decides that the position where the number of bits of the transmitted data becomes zero is the final bit position of the frame data.

14. The data transmission system as claimed in claim 13, wherein in the transmitter, said means for generating the frame data generates the frame data containing the transmitted data and the calculated error-detecting code such that the error-detecting code is arranged after the corresponding transmitted data and bit arrangements of the transmitted data and of the error-detecting code are set in a reverse order to each other.

15. The data transmission system as claimed in claim 13, wherein in the transmitter, said means for generating the frame data generates the frame data containing the transmitted data and the calculated error-detecting code such that the error-detecting code is arranged after" the corresponding transmitted data and bit arrangements of the transmitted data and of the error-detecting code are set in the same order.

16. The data transmission system as claimed in any one of claims 13, 14 and 15, further comprising:
   in the transmitter,
      means for conducting error-correcting coding of the generated frame data; and
      means for conducting interleaving of the frame data that has undergone the error-correcting coding, and
   in the receiver,
      means for conducting deinterleaving of the received frame data; and
      means for conducting error-correcting decoding of the frame data that has undergone the deinterleaving.

17. The data transmission system as claimed in claim 16, wherein
   in the transmitter,
      said means for generating the frame data generates the frame data containing a tail bit, and
      said means for conducting the error-correcting coding conducts the error-correcting coding with a convolutional code, and
   in the receiver,
      said means for conducting the error-correcting decoding assumes the final bit position of the frame data, frame by frame, for the frame data that has undergone the deinterleaving, conducts the error-correcting decoding thereof by a maximum likelihood decoding method up to said assumed final bit position, and at said assumed final bit position, calculates a likelihood difference between the maximum of likelihoods of a plurality of decoded data sequences that are candidates with respect to the transmitted data sequence and a likelihood of the decoded data sequence obtained by terminating the decoding with respect to the transmitted data sequence; and
      said means for deciding decides that among the assumed final bit positions of the frame data, a position where the obtained likelihood difference is within a predetermined range and the assumed error-detecting code agrees with the error-detecting code calculated on the basis of the assumed transmitted data is the final bit position of the frame data.

18. The data transmission system as claimed in claim 17, wherein in the receiver, the predetermined range regarding the likelihood difference at said means for deciding depends on the assumed final bit position of the frame data.

19. The data transmission system as claimed in claim 17, further comprising:
in the transmitter,
means for calculating transmission rate information indicating the number of bits of the transmitted data, frame by frame,
wherein said means for generating the frame data generates the frame data containing the calculated transmission rate information, and
in the receiver,
wherein both said means for conducting the error-correcting decoding and said means for calculating the error-detecting code assume the final bit position of the frame data on the basis of the transmission rate information in the received frame data.

20. The data transmission system as claimed in claim 19, wherein in the transmitter, said means for conducting the error-correcting coding conducts, for the transmission rate information, independent error-correcting coding that is separate from the error-correcting coding for the transmitted data, the error-detecting code, and the tail bit.

21. The data transmission system as claimed in claim 20, wherein in the transmitter, said means for conducting the error-correcting coding conducts the error-correcting coding of the transmission rate information by using a block code.

22. The data transmission system as claimed in claim 19, wherein in the transmitter, said means for conducting the error-correcting coding conducts the error-correcting coding of all of the transmission rate information, the transmitted data, the error-detecting code, and the tail bit collectively with a convolutional code.

23. The data transmission system as claimed in claim 19, wherein in the receiver, if said means for deciding does not decide that the final bit position of the frame data assumed on the basis of the transmission rate information in the received frame data is the final bit position of the frame data, both said means for conducting the error-correcting decoding and said means for calculating the error-detecting code assume a position other than the final bit position of the frame data assumed on the basis of the transmission rate information in the received frame data as the final bit position of the frame data.

24. The data transmission system as claimed in any one of claims 13, 14 and 15, wherein said error-detecting code is a CRC code.

25. A transmitter that puts variable length transmitted data into frames of a fixed time length and transmits these frames, comprising:
means for calculating an error-detecting code of the transmitted data, frame by frame;
means for generating frame data containing the transmitted data and the calculated error-detecting code such that the error-detecting code is arranged after the corresponding transmitted data; and
means for transmitting the generated frame data,
wherein if the number of bits of the transmitted data are zero, said means for calculating the error-detecting code considers a previously-specified bit pattern to be the error-detecting code.

26. The transmitter as claimed in claim 25, wherein said means for generating the frame data generates the frame data containing the transmitted data and the calculated error detecting code such that the error-detecting code is arranged after the corresponding transmitted data and bit arrangements of the transmitted data and of the error-detecting code are set in a reverse order to each other.

27. The transmitter as claimed in claim 25, wherein said means for generating the frame data generates the frame data containing the transmitted data and the calculated error-detecting code such that the error-detecting code is arranged after the corresponding transmitted data and bit arrangements of the transmitted data and of the error-detecting code are set in the same order.

28. The transmitter as claimed in any one of claims 25, 26 and 27, further comprising:
means for conducting error-correcting coding of the generated frame data; and
means for conducting interleaving of the frame data that has undergone the error-correcting coding.

29. The transmitter as claimed in claim 28, wherein
said means for generating the frame data generates the frame data containing a tail bit, and
said means for conducting the error-correcting coding conducts the error-correcting coding with a convolutional code.

30. The transmitter as claimed in any one of claims 25, 26 and 27, further comprising:
means for calculating transmission rate information indicating the number of bits of the transmitted data, frame by frame,
wherein said means for generating the frame data generates the frame data containing the calculated transmission rate information.

31. The transmitter as claimed in claim 30, wherein said means for conducting the error-correcting coding conducts, for the transmission rate information, independent error-correcting coding that is separate from the error-correcting coding for the transmitted data, the error-detecting code, and the tail bit.

32. The transmitter as claimed in claim 31, wherein said means for conducting the error-correcting coding conducts the error-correcting coding of the transmission rate information by using a block code.

33. The transmitter as claimed in claim 30, wherein said means for conducting the error-correcting coding conducts the error-correcting coding of all of the transmission rate information, the transmitted data, the error-detecting code, and the tail bit collectively with a convolutional code.

34. The transmitter as claimed in any one of claims 25, 26 and 27, wherein said error-detecting code is a CRC code.

35. A receiver for receiving frame data containing variable length transmitted data, and an error-detecting code calculated, frame by frame, for said transmitted data in each frame of a fixed time length such that the error-detecting code is arranged after the corresponding transmitted data, and if the number of bits in the transmitted data is zero, a previously specified bit pattern is considered to be the error-detecting code, comprising:
means for receiving the frame data;
means for assuming the transmitted data and the error-detecting code by assuming a final bit position of the frame data, frame by frame, for the received frame data, and calculating the error-detecting code of the assumed transmitted data;
means for deciding that among the assumed final bit positions of the frame data, a position where the assumed error-detecting code agrees with the error-detecting code calculated on the basis of the assumed transmitted data is the final bit position of the frame data; and
means for acquiring the transmitted data on the basis of a decision result, wherein said means for calculating the error-detecting code also assumes a position where the number of bits of the transmitted data becomes zero as the final bit position of the frame data, and if the error-detecting code when the position where the number of bits of the transmitted data becomes zero is assumed as the final bit position of the frame data agrees with said previously-specified bit pattern, said means for deciding decides that the position where the number of bits of the transmitted data becomes zero is the final bit position of the frame data.

36. The receiver as claimed in claim 35, further comprising:

means for conducting deinterleaving of the received frame data; and means for conducting error-correcting decoding of the frame data that has undergone the deinterleaving.

37. The receiver as claimed in claim 36, wherein said means for conducting the error-correcting decoding assumes the final bit position of the frame data, frame by frame, for the frame data that has undergone the deinterleaving, conducts the error-correcting decoding thereof by a maximum likelihood decoding method up to said assumed final bit position, and at said assumed final bit position, calculates a likelihood difference between the maximum of likelihoods of a plurality of decoded data sequences that are candidates with respect to the transmitted data sequence and a likelihood of the decoded data sequence obtained by terminating the decoding with respect to the transmitted data sequence; and said means for deciding decides that among the assumed final bit positions of the frame data, a position where the obtained likelihood difference is within a predetermined range and the assumed error-detecting code agrees with the error-detecting code calculated on the basis of the assumed transmitted data is the final bit position of the frame data.

38. The receiver as claimed in claim 37, wherein the predetermined range regarding the likelihood difference at said means for deciding depends on the assumed final bit position of the frame data.

39. The receiver as claimed in any one of claim 37 or 38, wherein both said means for conducting the error-correcting decoding and said means for calculating the error-detecting code assume the final bit position of the frame data on the basis of transmission rate information in the received frame data.

40. The receiver as claimed in claim 39, wherein if said means for deciding does not decide that the final bit position of the frame data assumed on the basis of the transmission rate information in the received frame data is the final bit position of the frame data, both said means for conducting the error-correcting decoding and said means for calculating the error-detecting code assume a position other than the final bit position of the frame data assumed on the basis of the transmission rate information in the received frame data as the final bit position of the frame data.

41. The receiver as claimed in any one of claims 35, 36 and 37, wherein said error-detecting code is a CRC code.

* * * * *

UNITED STATES PATENT AND TRADEMARK OFFICE
CERTIFICATE OF CORRECTION

PATENT NO. : 7,020,209 B1
APPLICATION NO. : 09/763375
DATED : March 28, 2006
INVENTOR(S) : Yukihiko Okumura It is certified that error appears in the above-identified patent and that said Letters Patent is hereby corrected as shown below:

On the title page item (56), line 1, delete "under other publications," and insert reference -- Okumura et al., "Blind Variable Rate Detection Using Verterbi Decoding Path-metric in Coherent DS-CDMA", Technical Research Report of the Institute of Electronics, Information and Communication Engineers, RCS 96-101, 14, November 1996, pgs. 17-23.--

On the title page item (56), page 2, line 1, delete "under other publications," and insert reference --Okumura et al., "Variable Rate Data Transmissions on Single Code-Channel in DS-CDMA", Technical Research Report of the Institute of Electronics, Information and Communication Engineers, EMCJ95-106, RCS 95-166, MW95 183, 27 February, 1996, pgs.55-60.--

Column 13
Line 10, change "herein wherein" to --herein, wherein--
Line 26, change "herein wherein" to --herein, wherein--

Column 14
Line 64, change "provides data" to --provides a data--

Column 22
Line 41, change "herein wherein" to --herein, wherein--

Signed and Sealed this

Twenty-sixth Day of December, 2006

JON W. DUDAS
*Director of the United States Patent and Trademark Office*